(12) United States Patent
Asawa et al.

(10) Patent No.: US 6,902,860 B2
(45) Date of Patent: Jun. 7, 2005

(54) TWO-LAYER IMAGEABLE ELEMENT COMPRISING THERMALLY REVERSIBLE POLYMERS

(75) Inventors: Yasuhiro Asawa, Goyoda (JP); Yasuhiro Ishizuka, Tatebayashi (JP); Eiji Hayakawa, Utsunomiya (JP); S. Peter Pappas, Midland, TX (US)

(73) Assignee: Kodak Polychrome Graphics LLC, Norwalk, CT (US)

( * ) Notice: Subject to any disclaimer, the term of this patent is extended or adjusted under 35 U.S.C. 154(b) by 100 days.

(21) Appl. No.: 10/034,982

(22) Filed: Dec. 28, 2001

(65) Prior Publication Data

US 2002/0160299 A1 Oct. 31, 2002

Related U.S. Application Data

(63) Continuation-in-part of application No. 09/751,650, filed on Dec. 29, 2000, now Pat. No. 6,506,536.

(51) Int. Cl.$^7$ .......................... C08G 85/00; G03F 7/38
(52) U.S. Cl. .................. 430/270.1; 430/281.1; 430/286.1; 430/320; 430/944; 430/945; 430/905
(58) Field of Search .................. 430/270.1, 281.1, 430/286.1, 320, 944, 945, 905

(56) References Cited

U.S. PATENT DOCUMENTS

| | | | | |
|---|---|---|---|---|
| 3,962,513 A | * | 6/1976 | Eames | 428/323 |
| 5,807,977 A | | 9/1998 | Malik et al. | 528/402 |
| 5,994,431 A | | 11/1999 | Olson et al. | 524/91 |
| 6,013,738 A | | 1/2000 | Daley et al. | 525/426 |
| 6,083,662 A | | 7/2000 | Miller et al. | 430/302 |
| 6,090,532 A | | 7/2000 | West et al. | 430/326 |
| 6,143,464 A | | 11/2000 | Kawauchi | 430/270.1 |
| 6,172,128 B1 | | 1/2001 | Lau et al. | 521/77 |
| 6,288,221 B1 | | 9/2001 | Grinstaff et al. | 536/25.3 |
| 6,291,586 B2 | | 9/2001 | Lasch et al. | 525/123 |
| 6,303,740 B1 | | 10/2001 | Singh | 528/289 |
| 6,320,018 B1 | | 11/2001 | Sijbesma et al. | 528/310 |
| 6,352,811 B1 | * | 3/2002 | Patel et al. | 430/270.1 |
| 6,506,536 B2 | * | 1/2003 | Pappas et al. | 430/270.1 |
| 6,649,324 B1 | * | 11/2003 | Fiebag et al. | 430/302 |

FOREIGN PATENT DOCUMENTS

| | | |
|---|---|---|
| EP | 433188 A1 | 6/1991 |
| EP | 0 908 305 A1 | 4/1999 |
| EP | 0 909 657 A2 | 4/1999 |
| JP | 2000-330265 | 11/2000 |
| WO | WO 98/14504 | 4/1998 |
| WO | WO 98/42507 | 10/1998 |
| WO | WO 98/54621 | 12/1998 |
| WO | WO 99/01795 | 1/1999 |

OTHER PUBLICATIONS

Supramolecular Polymer Materials: Chain Extension of Telechelic Polymers Using a Reactive Hydrogen–Bonding Synthon, Folmer et al., Advanced Materials 2000, 12, No. 12.

Hydrogen–Bonded Supramolecular Polymers Network, Lange et al., Journal of Polymer Science, Part A: Polymer Chemistry, vol. 27, p. 3657.

"Reversible Polymers Formed from Self–Complementary Monomers Using Quadruple Hydrogen Bonding," Sijbesma et al., Science, vol. 276, Nov. 28, 1997, p. 1601–1604.

"Use of Hydrogen Bonds To Control Moleculoar Aggregation. Extensive, Self–Complementary Arrays of Donors and Acceptors," Ducharme et al., Journal of Organic Chemistry, 1988, vol. 53, No. 24, pp. 5787–5789.

"Supramolecular Polymer Interactions Based on the Alternating Copolymer of Styrene and Maleimide," Lange et al., Macromolecules, 1995, vol. 28, pp. 782–783.

* cited by examiner

Primary Examiner—Yvette C. Thornton
(74) Attorney, Agent, or Firm—Faegre & Benson LLP

(57) ABSTRACT

The present invention includes a two-layer imageable element, including: a substrate, a top layer including a first thermally imageable composition including (a) a first thermally sensitive supramolecular polymer or (b) a thermally imageable composition free of the first thermally sensitive supramolecular polymer; and disposed between the substrate and the top layer, a bottom layer including a second thermally imageable composition, which includes a second thermally sensitive supramolecular polymer. The present invention also includes a method of producing the imaged element.

46 Claims, No Drawings

TWO-LAYER IMAGEABLE ELEMENT COMPRISING THERMALLY REVERSIBLE POLYMERS

This application is a Continuation-In-Part and claims priority from U.S. application Ser. No. 09/751,650, filed Dec. 29, 2000, now U.S. Pat. No. 6,506,536.

BACKGROUND OF THE INVENTION

1. Field of the Invention

The present invention relates to a two-layer imageable element including a substrate, a top layer including a first thermally imageable composition including a first thermally sensitive supramolecular polymer; and disposed between the substrate and the top layer, a bottom layer including a second thermally imageable composition including a second thermally sensitive supramolecular polymer. The thermally sensitive supramolecular polymer, which includes at least one covalently bonded unit and at least one thermally reversible non-covalently bonded unit that includes a two or more centered H-bond within each non-covalently bonded unit. More particularly, the present invention relates to a method of producing a two-layer imaged element.

2. Description of the Prior Art

WO 98/14504 discloses a supramolecular polymer containing monomeric units, which in pairs, form at least 4 H-bridges with one another. The article in *J. Org. Chem.*, 53, 5787–9 (1988) discloses bifunctional compounds that can associate into polymers or oligomers by 2-center H-bond units. Supramolecular polymers based on 3-center H-bond units are disclosed in *Macromolecules*, 28, 782–83 (1995). None of the above references discloses the use of these polymers in thermal imaging.

EP 969 966 discloses phenolic polymers together with a non-photosensitive solubility inhibitor which provides acceptor sites for H-bonding and EP 985 166 discloses the corresponding methods. The present invention is directed to a supramolecular polymer having non-covalent interactions, such as H-bonding, as an integral part of the polymer structure. The H-bonding in the present invention is not between a H-donor polymer and a solubility inhibitor having H-acceptor sites, but is an integral part of the polymer structure.

WO 99101795 discloses phenolic polymers, which are modified with groups that provide acceptor sites for H-bonding with other phenolic polymers. The present invention is directed to a supramolecular polymer having non-covalent interactions as an integral part of the polymer structure.

An article by B. J. B. Folmer et al., *Advanced Materials*, Vol. 12 (No. 12), pages 874–878 (2000), discloses supramolecular polymer materials. The article does not disclose polymers derived from polyfunctional materials, such as, polyfunctional phenolic resin, acrylic resin, polyester resin or polyurethane resin, nor does it disclose the use thereof in thermal imaging.

U.S. Pat. No. 6,143,464 describes a thermal positive image forming material in a single layer system. The photosensitive layer has sea/island structure. Photosensitive composition includes a co-polymer including 10 mol % or more of at least one of: (a) a monomer having in the molecule a sulfonamide NH group, (b) a monomer having in the molecule an active imino group and (c) acrylamide, methacrylamide, acrylate, methacrylate or hydroxy styrene, each having a phenolic hydoxyl group.

JP 2000-330265-A describes a thermal positive image forming composition in a ingle layer system. The photosensitive composition includes a resin, which has a urea bond on a side chain. The resin is dissolved into alkaline aqueous solution.

EP 908305 describes a thermal positive photosensitive composition in a double layer system. The top layer is sensitive to IR-radiation. Bottom layer includes a resin, which is soluble in an alkaline aqueous solution.

EP 909657 describes a thermal positive image forming material in a double layer system. Top layer includes a resin having phenolic hydroxyl groups and an IR-dye. The bottom layer includes co-polymer having sulfonyl amide group.

The present invention describes a 2 layer system, wherein both top and bottom layers have a thermally sensitive supramolecular polymer containing a non-covalently bonded unit, such as, a quadruple hydrogen bonding (QHB) unit.

SUMMARY OF THE INVENTION

The present invention includes a two-layer imageable element including:

a substrate;

a top layer including a thermally imageable composition, which includes: (a) a first thermally imageable composition including a first thermally sensitive supramolecular polymer which exhibits an increased solubility in an aqueous developer solution upon exposure to heat; the first thermally sensitive supramolecular polymer including: at least one covalently bonded unit; and at least one thermally reversible non-covalently bonded unit, which includes a two or more centered H-bond within each the non-covalently bonded unit or (b) a thermally imageable composition free of the first thermally sensitive supramolecular polymer; and disposed between the substrate and the top layer, a bottom layer including a second thermally imageable composition including a second thermally sensitive supramolecular polymer which exhibits an increased solubility in an aqueous developer solution upon exposure to heat; the second thermally sensitive supramolecular polymer including: at least one covalently bonded unit; and at least one thermally reversible non-covalently bonded unit, which includes a two or more centered H-bond within each non-covalently bonded unit.

The present invention further includes a two-layer imageable element including:

a substrate;

a top layer including a first thermally imageable composition including a first thermally sensitive supramolecular polymer which exhibits an increased solubility in an aqueous developer solution upon exposure to heat, the first thermally sensitive supramolecular polymer including: at least one covalently bonded unit; and at least one thermally reversible non-covalently bonded unit, which includes a two or more centered H-bond within each non-covalently bonded unit; and disposed between the substrate and the top layer, a bottom layer including a second thermally imageable composition including a second thermally sensitive supramolecular polymer which exhibits an increased solubility in an aqueous developer solution upon exposure to heat; the second thermally sensitive supramolecular polymer including: at least one covalently bonded unit; and at least one thermally reversible non-covalently bonded unit, which includes a two or more centered H-bond within each non-covalently bonded unit.

The present invention also includes a method of producing an imaged element. The method includes the steps of:

providing a two-layer imageable element including a substrate, a top layer including a thermally imageable composition including: (a) a first thermally imageable composition including a first thermally sensitive supramolecular polymer which exhibits an increased solubility in an aqueous developer solution upon exposure to heat; the first thermally sensitive supramolecular polymer including: at least one covalently bonded unit; and at least one thermally reversible non-covalently bonded unit, which includes a two or more centered H-bond within each non-covalently bonded unit or (b) a thermally imageable composition free of the first thermally sensitive supramolecular polymer; and disposed between the substrate and the top layer, a bottom layer including a second thermally imageable composition including a second thermally sensitive supramolecular polymer which exhibits an increased solubility in an aqueous developer solution upon exposure to heat; the second thermally sensitive supramolecular polymer including: at least one covalently bonded unit; and at least one thermally reversible non-covalently bonded unit, which includes a two or more centered H-bond within each non-covalently bonded unit;

exposing the two-layer imageable element to thermal radiation to produce imagewise exposed regions; and contacting the exposed two-layer imageable element and a developer within a period of time after the exposing step to remove the exposed regions and thereby produce the imaged element.

In the present invention, the image areas are reinforced with strong two or more centered H-bond links. Therefore, the image areas exhibit long press life and increased resistance to press chemicals when compared with the systems of the prior art, which include relatively weak single H-bond units. Thus, the thermally reversible polymers of the present invention can have relatively strong bonds and provide thermal solubilization systems that have enhanced differentiation between exposed and non-exposed areas. These polymers can undergo thermal solubilization and provide a durable, non-exposed area, corresponding to the etch resist in a PCB or to the image area in a printing plate.

The two-layer thermal positive working "computer-to-plate" systems, here after "CTP plates," according to the present invention have excellent solvent resistance, high run lengths and wide developer latitudes. The imagewise exposure and development steps of the present invention do not require an intermediate pre-development heating step. In addition, superior press life is achieved without the need of a post-development bake because of the strength of the two or more centered H-bond links, such as, 4-centered H-bond units, in the image areas. The superior press life resulting from the strongly bonded image is unexpected for a two-layer, no-preheat, digitally imaged composition. In addition, the inventive element of the present invention is relatively simple to manufacture. Accordingly, the present invention provides thermally reversible polymers that can be used in simple and cost effective methods that are useful in thermal imaging of lithographic plates and circuit boards.

DETAILED DESCRIPTION OF THE INVENTION

Lithographic printing is based on the immiscibility of oil and water. Ink receptive areas are generated on the surface of a hydrophilic surface. When the surface is moistened with water and then ink is applied, the hydrophilic background areas retain the water and repel the ink. The ink receptive areas accept the ink and repel the water. The ink is transferred to the surface of a material upon which the image is to be reproduced. Typically, the ink is first transferred to an intermediate blanket, which in turn transfers the ink to the surface of the material upon which the image is thereafter reproduced.

Lithographic printing plate precursors, i.e., imageable elements, typically include a radiation-sensitive coating applied over the hydrophilic surface of a support material. If after exposure to radiation, the exposed regions of the coating become soluble and are removed in the developing process, revealing the underlying hydrophilic surface of the support, the plate is called a positive-working printing plate. Conversely, if exposed regions of the plate become insoluble in the developer and the unexposed regions are removed by the developing process, the plate is called a negative-working plate. In each instance, the regions of the radiation-sensitive layer that remain (i.e., the image areas) are ink-receptive and the regions of the hydrophilic surface revealed by the developing process accept water and repel ink.

The present invention is useful in positive-working printing plates, which include a substrate, a bottom layer coated on the substrate and a top layer coated on the bottom layer. Preferably, the surface of the substrate underlying the thermally imageable layers is hydrophilic.

Solvent resistance of thermal positive CTP plates is generally, poor. The present inventors have found that solvent resistance of two-layer thermal positive CTP plates can be improved by using a quatruple hydrogen bonding (QHB) functional polymer in the bottom layer. The two-layer thermal positive plates according to the present invention also had good developing latitudes and high run lengths.

The top layer can include either (a) a first thermally imageable composition including a first thermally sensitive supramolecular polymer which exhibits an increased solubility in an aqueous developer solution upon exposure to heat, or (b) a thermally imageable composition free of the first thermally sensitive supramolecular polymer. The first thermally sensitive supramolecular polymer includes at least one covalently bonded unit and at least one thermally reversible non-covalently bonded unit, which includes a two or more centered H-bond within each non-covalently bonded unit. The thermally imageable composition that is free of the first thermally sensitive supramolecular polymer can be any suitable composition that is free of the first thermally sensitive supramolecular polymer. Preferably, the composition that is free of the first thermally sensitive supramolecular polymer includes a novolak resin and an infrared dye.

The bottom layer, which is disposed between the substrate and the top layer, includes a second thermally imageable composition including a second thermally sensitive supramolecular polymer which exhibits an increased solubility in an aqueous developer solution upon exposure to heat. The second thermally sensitive supramolecular polymer includes at least one covalently bonded unit; and at least one thermally reversible non-covalently bonded unit, which includes a two or more centered H-bond within each non-covalently bonded unit.

The term "unit" in the context of the present invention refers to any chemical group, moiety or functionality. Examples of such units include covalently bonded units, such as those derived from novolak resins, and non-covalently bonded units, i.e., two or more centered H-bond links, such as those derived from 4-centered H-bonded units.

Such 4-centered H-bonded units in a preferred embodiment have a structure resulting from association of the two sites capable of quadruple hydrogen bonding, namely two isocytosine units. The association of the two quadruple hydrogen bonding sites and the quadruple hydrogen bonded unit resulting therefrom, i.e., the 4-centered H-bonded unit, is schematically represented below for the "keto" tautomer, which is one of the two possible tautomeric forms of the isocytosine ring system. The schematic representation is for an isocytosine having the substituent —CH$_2$CH$_2$CH$_2$—R:

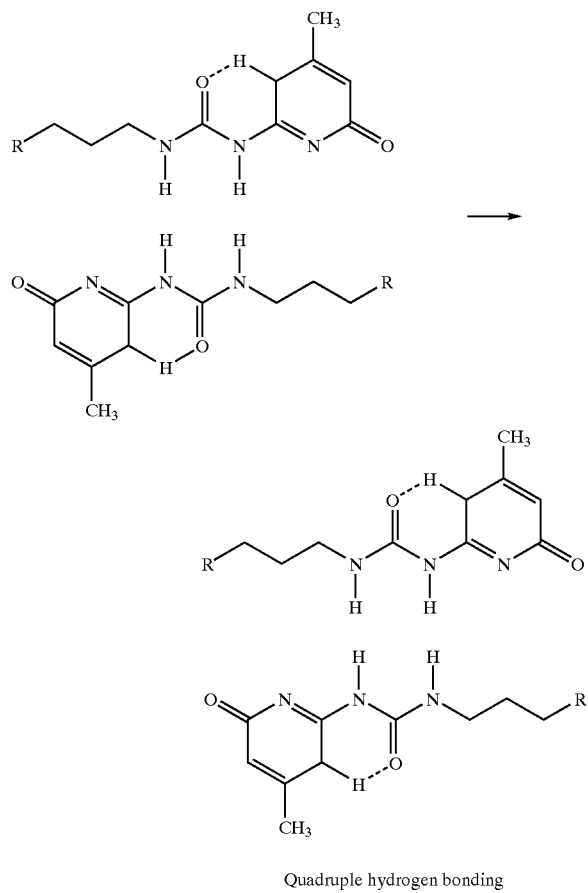

Quadruple hydrogen bonding

The 4-centered H-bonded unit can result from the association of two sites that are in the "enol" tautomeric form in which the hydrogen is on the oxygen atom instead of being on the nitrogen. The "keto" and "enol" tautomeric forms of an isocytosine derivative are described and proposed structures shown in the previously cited WO 98/14504, the contents of which are incorporated herein by reference in its entirety. Accordingly, whenever a composition of present invention is represented by the formula of the "keto" form, it should be understood that the actual compound will exist either in the "keto" or in the "enol" tautomeric forms or in a combination of the "keto" and "enol" tautomeric forms.

As an example, the formation of such a 4-centered H-bonded unit according to the present invention resulting from a 4-centered H-bonding interaction of two 6-methylisocytosinyl groups, each attached to a group R, is schematically represented below:

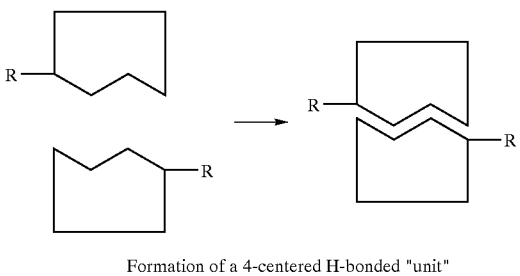

Formation of a 4-centered H-bonded "unit"

The term "supramolecular polymer" in the context of the present invention refers to a polymer which derives it's polymeric properties through a combination of covalent bonds and specific secondary interactions, which includes hydrogen bonding, particularly two or more centered H-bond links. Such secondary interactions provide high bond strength and contribute substantially to the polymeric behavior.

The non-covalently bonded unit according to the present invention includes at least a two-centered H-bond within each unit. Preferably, the non-covalently bonded unit includes a two, three or four centered H-bond within each unit. H-bonds that are higher than four centered can also be useful in the present invention.

In addition to the two or more centered H-bonding, the non-covalently bonded unit in the thermally imageable compositions of the present invention further includes one or more additional secondary interactions, such as, van der Waals associations, hydrophobic associations, ionic associations and a combination thereof. Furthermore, in addition to the two or more centered H-bonded units, the thermally sensitive supramolecular polymer itself can have additional intermolecular or intramolecular interactions, including intermolecular or intramolecular H-bonding.

Preferably, the thermally reversible non-covalently bonded unit in the top layer is a two-, three or four-centered H-bonded unit. In one embodiment, the thermally reversible non-covalently bonded unit includes a two-centered H-bonded unit, which includes two 2-pyridone groups. In another embodiment, the thermally reversible non-covalently bonded unit includes a three-centered H-bonded unit, which includes a cyclic imide group and a 2,6-diaminotriazine groups. In yet another embodiment, the thermally reversible non-covalently bonded unit includes a four-centered H-bonded unit, which includes two isocytosine groups.

To achieve developability, the thermally sensitive supramolecular polymer in the thermally imageable compositions must have at least one base-soluble functional group having a pKa of less than 14. Such base-soluble functional groups include, for example, carboxylic, sulfonic, imide, N-acyl sulfonamide and phenolic hydroxy groups.

The term "hydrocarbyl" in the context of the present invention refers to a linear, branched or cyclic alkyl, alkenyl, aryl, aralkyl or alkaryl of 1 to 22 carbon atoms, substituted derivatives thereof, wherein the substituent group is selected from halogen, hydroxy, hydrocarbyloxy, carboxyl, ester, ketone, cyano, amino, amido and nitro groups. Hydrocarbyl groups in which the carbon chain is interrupted by oxygen, nitrogen or sulfur are also included in the term "hydrocarbyl".

The term "hydrocarbylene" in the context of the present invention refers to a linear, branched or cyclic alkylene, vinylene, arylene, aralkylene or alkarylene of 1 to 22 carbon atoms, substituted derivatives thereof, wherein the substituent group is halogen, hydroxy, carboxyl, hydrocarbyloxy, ester, ketone, cyano, amino, amido and nitro groups. Hydrocarbylene groups in which the carbon chain is interrupted by oxygen, nitrogen or sulfur are also included in the term "hydrocarbylene".

Bifunctional compounds, which can associate into an oligomer or polymer by two centered H-bond units are disclosed in *J. Org. Chem.*, 53, 5787–9 (1988). Supramolecular polymers based on three centered H-bond units are disclosed in *Macromolecules*, 28, 782–83 (1995). The contents of these articles are incorporated herein by reference for all purposes. Representative of the compounds that can associate into an oligomer or polymer by two centered H-bond units are bridged bipyridone derivatives such as those disclosed in the previously incorporated *J. Org. Chem.*, 53, 5787–9 (1988), provided that such systems have at least one base-soluble functional group, such as, carboxylic, sulfonic, imide, N-acyl sulfonamide or phenolic hydroxy groups.

The non-covalently bonded unit in this embodiment includes a bridged bipyridone derivative capable of forming a two-centered H-bond. The thermally sensitive supramolecular polymer in the first thermally imageable composition according to the present invention includes a supramolecular polymer derived from monomers represented by the formula:

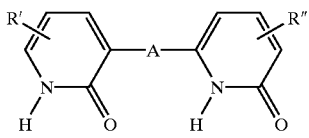

wherein each R' and R" can independently be H, linear, branched or cyclic alkyl, aryl, aralkyl, alkaryl, substituted aryl, alkenyl, halogen, cyano, nitro, alkoxy, aryloxy, alkoxycarbonyl, amido, acyl, aminocarbonyl, carboxylic, sulfonic, imide, N-acyl sulfonamide or phenolic hydroxy, provided that at least one of the R' and R" groups is carboxylic, sulfonic, imide, N-acyl sulfonamide or phenolic hydroxy. A can be a bridging group, such as, alkylene, arylene, aralkylene, alkarylene, substituted arylene, —O—, —S—, NR''', —CH=CH— or —C≡C—.

Representative of the compounds that can associate by three centered H-bond units are maleimide/styrene copolymers associated with 4-vinyl-2,6-diaminotriazine/styrene copolymers, such as those disclosed in the previously incorporated *Macromolecules*, 28, 782–83 (1995), provided that such copolymers have at least one base-soluble functional groups, such as, carboxylic, sulfonic, imide, N-acyl sulfonamide or phenolic hydroxy groups.

The non-covalently bonded unit in this embodiment can be a group capable of forming one or more three centered H-bonds with another same or different such group to form a three centered H-bonded pair.

In one embodiment, the thermally sensitive supramolecular polymer in the first thermally imageable composition according to the present invention includes a supramolecular polymer derived from maleimide/styrene copolymers associated with 4-vinyl-2,6-diaminotriazine/styrene copolymers. Terpolymers thereof are also suitable for use as the thermally sensitive supramolecular polymer in the thermally imageable composition according to the present invention.

4-Vinyl-2,6-diaminotriazine and copolymers thereof can also be readily converted into the corresponding N,N'-diacetyl derivatives by conventional acetylation techniques, using acetyl chloride or acetic anhydride. Such N,N'-diacetyl-2,6-diaminotriazine groups are capable of self-associating into four centered H-bonds, as described in *Chem. Commun.*, 287–288 (2001) for porphyrin derivatives.

The covalently bonded unit according to the present invention is derived from a polyfunctional material covalently bonded to sites that are also bonded to the non-covalently bonded units. At least one, preferably more than one, same or different polyfunctional materials can be bonded to such sites.

The supramolecular polymer can be any polymer or resin that is capable of producing properties required for thermal imaging. For example, to achieve developability, the polyfunctional material has at least one base-soluble functional group having a pKa of less than 14. Such base-soluble functional groups include, for example, carboxylic, sulfonic, imide, N-acyl sulfonamide and phenolic hydroxy groups.

The preferred polyfunctional materials include polyfunctional phenolic resins, acrylic resins, polyester resins, polyurethane resins, and combinations thereof. Preferably, the polyfunctional phenolic resin is a phenol/cresol novolak, polyvinyl phenol polymer, vinyl phenol/hydrocarbyl acrylate copolymer, pyrogallol/acetone polymer or a mixture thereof.

In a preferred embodiment, the thermally sensitive polymer in the top layer is a supramolecular polymer represented by the formula:

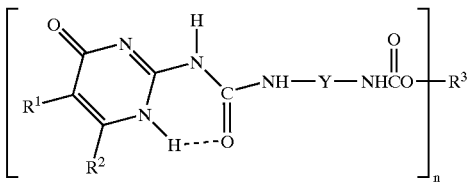

wherein each $R^1$ and $R^2$ is independently selected from the group consisting of: hydrogen and hydrocarbyl; Y is a hydrocarbylene derived from a diisocyanate represented by the formula $Y(NCO)_2$; $R^3$ is a phenolic residue derived from a polyfunctional phenolic resin represented by the formula $R^3(OH)_n$; and n is at least 1.

Preferably, the polyfunctional phenolic resin in the top layer is phenol/cresol novolak, polyvinyl phenol polymer, vinyl phenol/hydrocarbyl acrylate copolymer, pyrogallol/acetone polymer and a mixture thereof. The diisocyanates that are suitable for use in the top layer of the present invention include any diisocyanates, also referred to herein as "difunctional isocyanates." Preferably, the diisocyanate is selected from isophorone diisocyanate, methylene-bisphenyl diisocyanate, toluene diisocyanate, hexamethylene diisocyanate, tetramethylxylylene diisocyanate, dimers thereof, adducts thereof with diols, and mixtures thereof.

Because the polyfunctional phenolic resin in the top layer has n functional groups, up to n hydroxy groups can react with an equal number of isocyanate functional groups, each attached to a site bearing a non-covalently bonded unit. Preferably, in the above-described supramolecular polymer n is 1, 2 or 3.

Thus, when n=2 in the above preferred embodiment, two hydroxy groups from a polyfunctional phenolic resin react with an equal number of isocyanate functional groups, each attached to a site bearing a non-covalently bonded unit, to produce a linear polymer in which the chain growth is the result of association of sites that are capable of four-centered hydrogen bonding to produce a quadruple hydrogen bonding unit.

When n=3, three hydroxy groups from a polyfunctional phenolic resin react with an equal number of isocyanate functional groups, each attached to a site bearing a non-covalently bonded unit, to produce a crosslinked polymer in which crosslinking is achieved through association of sites that are capable of four-centered hydrogen bonding to produce three quadruple hydrogen bonding units. Thus, the thermally sensitive supramolecular polymer can be crosslinked. Preferably, such crosslinks are thermally reversible.

Preferably, the thermally reversible non-covalently bonded unit in the bottom layer is a four-centered H-bonded unit, such as, a four-centered H-bond derived from two isocytosine groups. However, the thermally reversible non-covalently bonded unit in the bottom layer can also be a two- or three-centered H-bonded unit.

Preferably, the covalently bonded unit in the bottom layer is derived from a polymer, which is soluble or dispersible in an aqueous developer. To be soluble or dispersible in an aqueous developer, the polymer should have at least one base soluble functional group, such as, a hydroxyl group, preferably an aromatic hydroxyl group, such as, a phenolic hydroxyl, a carboxylic acid, sulfonic acid, phosphoric acid, imide, N-acyl sulfonamide or a combination thereof.

The thermally sensitive polymer in the bottom layer can be formed by polymerizing a monomer mixture, which includes one or more of an ethylenically unsaturated monomer having a functional group, such as, hydroxyl, carboxylic acid, sulfonic acid, phosphoric acid or a combination thereof.

The ethylenically unsaturated monomer in the bottom layer can be compounds represented by the formula:

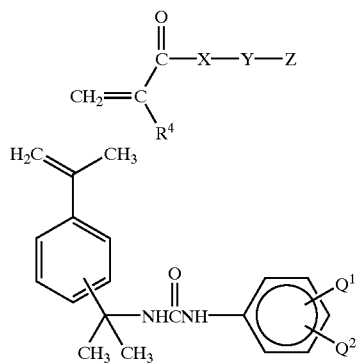

or a mixture thereof.

Each $Q^1$ and $Q^2$ in the formulas can independently be hydroxyl or carboxylic acid groups.

$R^4$ can be hydrogen, linear, branched or cyclic alkyl of 1 to 22 carbon atoms, linear, branched or cyclic substituted alkyl of 1 to 22 carbon atoms, aryl of 6 to 24 carbon atoms or substituted aryl of 6 to 24 atoms, wherein the substituent can be alkyl, aryl, halogen, keto, ester, alkoxy or cyano.

X can be O, S and $NR^5$ wherein $R^5$ is hydrogen, linear, branched or cyclic alkyl of 1 to 22 carbon atoms, linear, branched or cyclic substituted alkyl of 1 to 22 carbon atoms, aryl of 6 to 24 carbon atoms or substituted aryl of 6 to 24 atoms, wherein the substituent can be alkyl, aryl, halogen, keto, ester, alkoxy or cyano.

Y is linear, branched or cyclic alkylene of 1–22 carbon atoms, alkyleneoxyalkylene, poly(alkyleneoxy) alkylene, a ureido-containing group, such as, alkylene-NHCON($R^5$)— or it can be a bond.

Z can be hydrogen, hydroxyl, carboxylic acid, or a group represented by the formula:

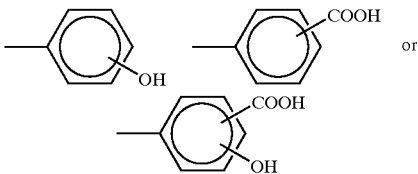

Examples of the ethylenically unsaturated monomers having one or more base soluble functional group include compounds represented by a the formula:

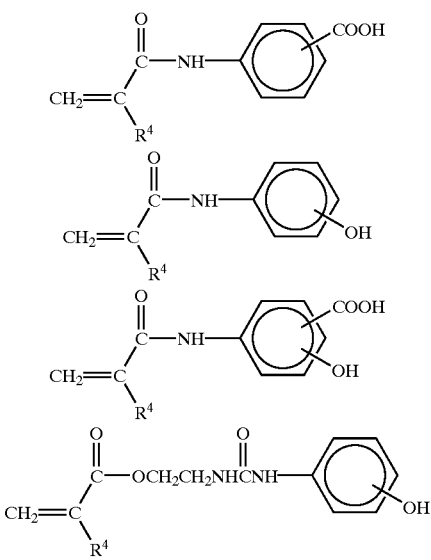

and a combination thereof.

The monomer mixture can further include an ethylenically unsaturated comonomer. Examples of such ethylenically unsaturated comonomers include acrylic acid, methacrylic acid, acrylic acid ester, methacrylic acid ester, hydroxyethyl acrylate, hydroxyethyl methacrylate, hydroxypropyl acrylate, hydroxypropyl methacrylate, acrylamide, methacrylamide, N-methylacrylamide, N-methylmethacrylamide, acrylonitrile, methacrylonitrile, vinyl chloride, vinylidene chloride, vinyl acetate, vinyl ether, styrene, N-phenylmaleimide and a mixture thereof.

The second thermally sensitive supramolecular polymer, which is included in the bottom layer, is represented by the formula:

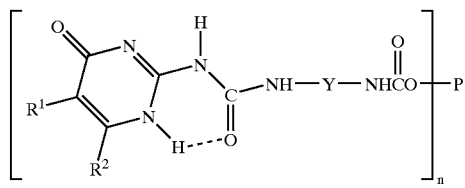

wherein each $R^1$ and $R^2$ is independently hydrogen or hydrocarbyl;

wherein Y is a hydrocarbylene derived from a diisocyanate represented by the formula $Y(NCO)_2$;

wherein P is a residue derived from a an n functional aqueous developer soluble or dispersible polymer represented by the formula $P(OH)_n$ wherein n is at least 1.

The above n functional aqueous developer soluble or dispersible polymer can be formed by polymerizing a monomer mixture, which includes one or more of an ethylenically unsaturated monomer having a functional group such as hydroxyl, preferably aromatic hydroxyl, such as, phenolic hydroxyls, carboxylic acid, sulfonic acid, phosphoric acid or a combination thereof.

The above n functional aqueous developer soluble or dispersible polymers are preferably formed from the following ethylenically unsaturated monomers:

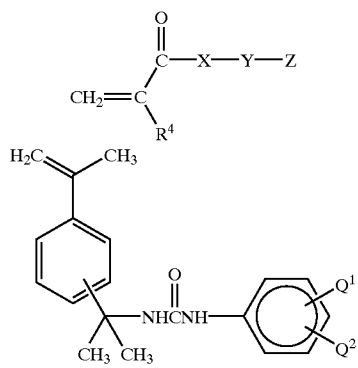

or a mixture thereof;

wherein each $Q^1$ and $Q^2$ is independently selected from the group consisting of: hydroxyl and carboxylic acid groups;

$R^4$ is hydrogen, linear, branched or cyclic alkyl of 1 to 22 carbon atoms, linear, branched or cyclic substituted alkyl of 1 to 22 carbon atoms, aryl of 6 to 24 carbon atoms or substituted aryl of 6 to 24 atoms, wherein the substituent is alkyl, aryl, halogen, keto, ester, alkoxy and cyano;

X is O, S and $NR^5$ wherein $R^5$ is hydrogen, linear, branched or cyclic alkyl of 1 to 22 carbon atoms, linear, branched or cyclic substituted alkyl of 1 to 22 carbon atoms, aryl of 6 to 24 carbon atoms or substituted aryl of 6 to 24 atoms, wherein the substituent is alkyl, aryl, halogen, keto, ester, alkoxy and cyano;

Y is linear, branched or cyclic alkylene of 1–22 carbon atoms, alkyleneoxyalkylene, poly(alkyleneoxy) alkylene or a bond; and Z is hydrogen, hydroxyl, carboxylic acid, or a group represented by the formula

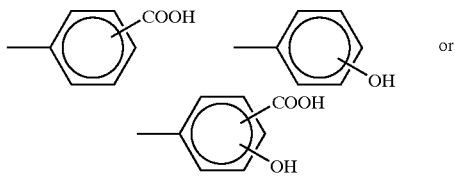

Examples of the ethylenically unsaturated monomers having one or more base soluble functional group include compounds represented by a the formula:

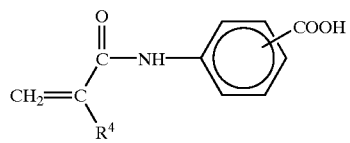

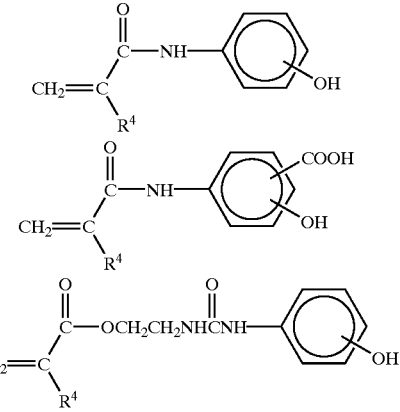

and a combination thereof.

The preferred ethylenically unsaturated comonomers include acrylic acid, methacrylic acid, acrylic acid ester, methacrylic acid ester, hydroxyethyl acrylate, hydroxyethyl methacrylate, hydroxypropyl acrylate, hydroxypropyl methacrylate, acrylamide, methacrylamide, N-methylacrylamide, N-methylmethacrylamide, acrylonitrile, methacrylonitrile, vinyl chloride, vinylidene chloride, vinyl acetate, vinyl ether, styrene, N-phenylmaleimide and a mixture thereof.

The diisocyanates that are suitable for use in the bottom layer of the present invention can be the same or different than the diisocyanates used in the top layer, and can include any diisocyanate. Preferably, the diisocyanate is selected from isophorone diisocyanate, methylene-bis-phenyl diisocyanate, toluene diisocyanate, hexamethylene diisocyanate, tetramethylxylylene diisocyanate, dimers thereof, adducts thereof with diols, and mixtures thereof.

In another preferred embodiment, the first and/or second thermally imageable composition of the present invention further includes a photothermal converter material.

The supramolecular polymer can be prepared by a process including the steps of:

contacting a hydrocarbyl-substituted isocytosine and a disocyanate to produce an isocytosine/isocyanate mono-adduct; and contacting the isocytosine/isocyanate mono-adduct and (1) a polyfunctional material, such as, a polyfunctional phenolic resin, acrylic resin, polyester resin, polyurethane resin, and a combination thereof, for the top layer; or (2) a polymer formed by polymerizing a monomer mixture, which includes one or more of an ethylenically unsaturated monomer having a functional group, such as, hydroxyl, carboxylic acid, sulfonic acid, phosphoric acid or a combination thereof, and optionally a comonomer, for the bottom layer;

wherein the contacting is carried out at a temperature and for a period of time sufficient to produce the supramolecular polymer.

Preferably, the hydrocarbyl groups in the above process are independently alkyl groups of 1 to 22 carbon atoms and the diisocyanate is isophorone diisocyanate, methylene-bisphenyl diisocyanate, toluene diisocyanate, hexamethylene diisocyanate, tetramethylxylylene diisocyanate, dimers thereof, adducts thereof with diols, or mixtures thereof. The polyfunctional phenolic resin can be phenol/cresol novolak, polyvinyl phenol polymer, vinyl phenol/hydrocarbyl acrylate copolymer, pyrogallol/acetone polymer or a mixture thereof.

The isocytosine/isocyanate mono-adduct can be in a monomeric or quadruple hydrogen bonded dimeric form having a quadruple hydrogen bonded unit. The monomeric form is represented by the formula:

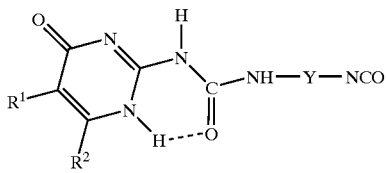

wherein each $R^1$ and $R^2$ can independently be hydrogen and hydrocarbyl; Y is a hydrocarbylene derived from a diisocyanate represented by the formula $Y(NCO)_2$, the diisocyanate being selected from isophorone diisocyanate, methylene-bis-phenyl diisocyanate, toluene diisocyanate, hexamethylene diisocyanate, tetramethylxylylene diisocyanate, dimers thereof, adducts thereof with diols, and mixtures thereof.

The dimeric form of the isocytosine/isocyanate mono-adduct has a structure resulting from association of the two sites capable of quadruple hydrogen bonding, namely two isocytosine units. The association of the two quadruple hydrogen bonding sites and the quadruple hydrogen bonded unit resulting therefrom, i.e., the 4-centered H-bonded unit, is schematically represented below for a related system in which the —Y—NCO group is replaced with the group —$CH_2CH_2CH_2$—R:

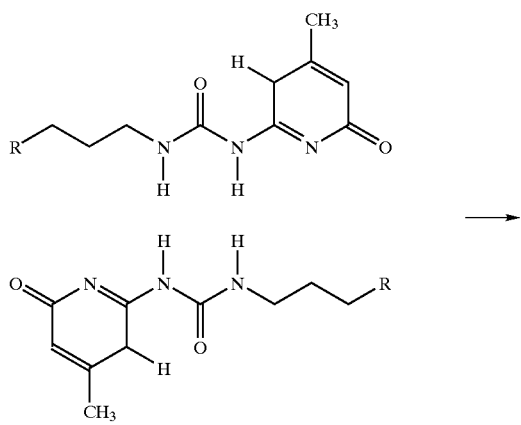

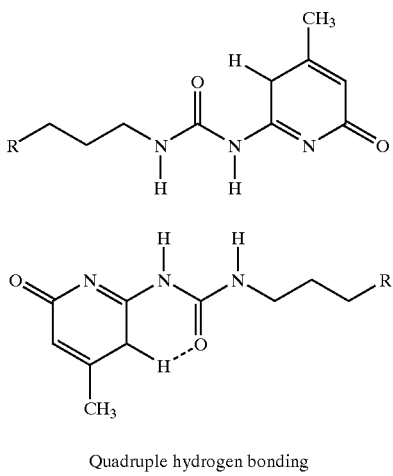

Quadruple hydrogen bonding

The isocytosine/isocyanate bis-adduct can be in a monomeric form or it can be in a quadruple hydrogen bonded oligomeric or polymeric form. The quadruple hydrogen bonded oligomeric or polymeric form results from association of two sites capable of quadruple hydrogen bonding, each from a different isocytosine/isocyanate bis-adduct, to produce an oligomer or polymer having repeating units of associated quadruple hydrogen bonding units, i.e., the 4-centered H-bonded units.

The monomeric form of the isocytosine/isocyanate bis-adduct is represented by the formula:

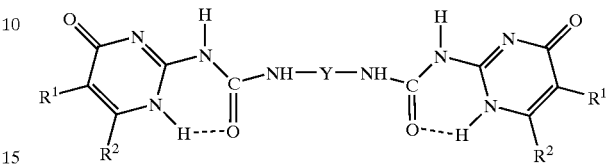

wherein each $R^1$ and $R^2$ can independently be hydrogen and hydrocarbyl and Y is a hydrocarbylene derived from a diisocyanate represented by the formula $Y(NCO)_2$.

Reaction of 1 mole of an isocytosine derivative with 1 mole of diisocyanate, such as isophorone diisocyanate, produces the isocytosine/isocyanate 1:1 adduct, which will spontaneously dimerize to form a dimeric mono-adduct having a thermally reversible 4-center H-bond. The resulting dimeric mono-adduct has free isocyanate groups on each end. This dimeric mono-adduct can then be used to form thermally reversible crosslinks with phenolic polymers. Any unreacted diisocyanate, such as isophorone diisocyanate, can also crosslink the phenolic polymers, however such crosslinking is not reversible.

To avoid crosslinking by the unreacted diisocyanate, an excess of isocytosine, i.e., about 10–20% molar excess, is preferably used. Excess isocytosine can further react with the mono-adduct, which can also dimerize spontaneously to give a diisocyanate bis-adduct having two or more thermally reversible 4-center H-bonds.

Using "I" for the diisocyanate and "M" for isocytosine derivative, the reactions can be illustrated as follows:

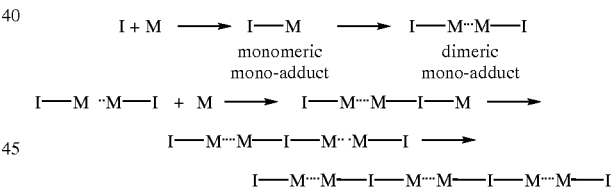

To maximize the formation of lower order adducts, isocytosine is added slowly to the diisocyanate to ensure that an excess diisocyanate is present at the early stages of the reaction.

The present invention is suitable for use in multilayer thermally imageable elements that are useful in lithographic printing, including lithographic printing plates that can be thermally imaged by imagewise exposure with a laser or a thermal printing head. The multilayer thermally imageable element is useful as a precursor for a lithographic printing member. In a multilayer thermally imageable system, the thermally imageable element has a top layer and a bottom layer. While different, the thermally sensitive supramolecular polymers of both the top and bottom layers include at least one covalently bonded unit; and at least one thermally reversible non-covalently bonded unit, which includes a two or more centered H-bond within each of the non-covalently bonded units. The top layer includes a thermally sensitive supramolecular polymer. The bottom layer includes one or more QHB-functionalized materials, including: (1) QHB-functionalized supramolecular polymers or copolymers derived from polymerization or copolymerization of suitably functionalized monomers; and optionally (2) QHB-functionalized phenolic supramolecular polymers.

In their hydrogen bonded form, the QHB-functionalized top and bottom layer polymeric materials are not very soluble in aqueous alkaline developer prior to exposure to heat. However, both top and bottom layers exhibit an increased solubility in an aqueous developer solution upon exposure to heat, i.e., they both become soluble in the aqueous alkaline developer following thermal exposure and thereby, they become penetrable to the aqueous alkaline developer.

The bottom layer of the imageable element can further include a QHB-functionalized phenolic supramolecular polymer, such as, a polyfunctional phenolic resin, including a QHB-functionalized phenol/cresol novolak, QHB-functionalized polyvinyl phenol polymer, QHB-functionalized vinyl phenol/hydrocarbyl acrylate copolymer, QHB-functionalized pyrogallol/acetone polymer or a mixture thereof.

Preferably, the bottom layer of the imageable element includes both a QHB-functionalized phenolic supramolecular polymer and a QHB-functionalized supramolecular polymers or copolymers derived from polymerization or copolymerization of suitably functionalized monomers.

The bottom layer of the imageable element can still further include an acrylic polymer, which can be formed by polymerizing one or more ethylenically unsaturated monomers and comonomers including acrylic acid, methacrylic acid, acrylic acid ester, methacrylic acid ester, hydroxyethyl acrylate, hydroxyethyl methacrylate, hydroxypropyl acrylate, hydroxypropyl methacrylate, acrylonitrile, methacrylonitrile, acrylamide, methacrylamide, N-methylacrylamide, N-methylmethacrylamide, vinyl chloride, vinylidene chloride, vinyl acetate, vinyl ether, styrene, N-phemylmaleimide and a mixture thereof. More particularly, the bottom layer can contain a polymeric material, such as, a terpolymer of methacrylic acid, acrylamide and N-phenyl maleimide, which is not a supramolecular polymer.

In addition to the thermally imageable layer, the thermally imageable element can have additional layers, such as, an underlying layer.

Possible functions of an underlying layer include:

(1) to enhance developability of the imagewise unexposed areas; and (2) to act as a thermal insulating layer for the imagewise exposed areas.

Such thermal insulating polymeric layer prevents otherwise rapid heat dissipation, for example, through the heat conducting aluminum substrate. This allows more efficient thermal imaging throughout of the thermally imageable layer, particularly in the lower sections. In accordance with these functions, the underlying layer should be soluble or at least dispersible in the developer and, preferably, have a relatively low thermal conductivity coefficient.

The thermally imageable element can further have an overlying layer. Possible functions of an overlying layer include:

(1) to prevent damage, such as scratching, of the surface layer during handling prior to imagewise exposure; and (2) to prevent damage to the surface of the imagewise exposed areas, for example, by over-exposure which could result in partial ablation. The overlying layer should be soluble, dispersible or at least permeable to the developer.

The present invention still further includes a method of producing an imaged element. The method includes the steps of:

providing a two-layer imageable element including a substrate, a top layer including a first thermally imageable composition including a first thermally sensitive supramolecular polymer according to the present invention and a bottom layer including a second thermally imageable composition including a second thermally sensitive supramolecular polymer according to the present invention;

exposing the two-layer imageable element to thermal radiation to produce imagewise exposed regions; and contacting the exposed two-layer imageable element and a developer within a period of time after the exposing step to remove the exposed regions and thereby produce the imaged element.

Preferably, the method can further includes a photothermal converting material and the step of exposing the imageable element to thermal radiation is preferably carried out using an infrared laser, typically for a period of time up to 1 hour, with a pixel dwell time of not more than 100 $\mu$s.

The developer composition is dependent on the nature of the polymeric substance, but is preferably an aqueous composition. Common components of aqueous developers include surfactants, chelating agents, such as, salts of ethylenediamine tetraacetic acid, organic solvents, such as, benzyl alcohol, and alkaline components, such as, inorganic metasilicates, organic metasilicates, hydroxides and bicarbonates. Preferably, the aqueous developer is an alkaline developer containing inorganic metasilicates or organic metasilicates when the polymeric substance is a phenolic resin.

Typically, the step of exposing the imageable element to thermal radiation is carried out using an infrared laser. However, other methods such as visible or UV laser imaging may also be used, provided that a photoconverter, i.e., a photothermal converter, is present. Thus, for exposure with such visible or UV radiation sources, the composition generally includes a photothermal converting material.

The Applicants have unexpectedly discovered that despite the strong multi-centered H-bonding, it was possible to thermally reverse such bonding during IR laser exposure in which the pixel dwell time of the laser is less than 100 $\mu$s. Thermally reversing the bonding by exposing at a pixel dwell time of not more than 100 $\mu$s enables one to produce an imaged element economically and within a short period of time, thereby providing a significant cost advantage over methods that require exposures at a pixel dwell time of more than 100 $\mu$s. Accordingly, the thermal radiation in the method of the present invention preferably has a pixel dwell time of not more than 100 $\mu$s. Furthermore, despite the expected ease of reformation of strong multi-centered H-bonding, the Applicants have discovered surprisingly that, following exposure, it was possible to remove the exposed areas with an aqueous developer prior to reformation of the multi-centered H-bonded units.

A characteristic feature of this process is transiency of thermal solubilization in that developability decreases with time following exposure. Based on the examples, imageable elements should preferably be developed within up to 1 hour, more preferably within up to 30 minutes, most preferably within up to 10 minutes following exposure. For example, in the case of infrared laser imaging, the period of time between the steps of exposing and treating with a developer is preferably less than about 10 minutes. As mentioned above, the method of the present invention can be used in one or two layer systems.

In the two layer systems, the bottom layer is soluble or dispersible in a developer, whereas the top layer is insoluble in the developer. Imagewise thermal exposure of such composite layer increases the rate of removal of the exposed areas of both layers.

The rate of removal of the exposed areas can be increased by enhanced rate of dissolution or dispersibility of the bottom layer and by enhanced permeability of the top layer. The supramolecular polymers of the present invention can be used in the top layer.

The thermally imageable element of the present invention is useful in digital imaging applications, including printing plates and printed circuit boards.

Synthetic Route:

The synthetic route describes in detail the synthesis of "RESIN A". Further syntheses were undertaken to produce "RESIN B" and "RESIN C" as described in table A.

Synthesis of the Quadruple Hydrogen Bonding Entity (QHBE)

Stage 1

Into a 250 ml flask were added 100 g of dried tetrahydrofuran (THF) and 13.78 g (0.11 mole) of dried 6-methylisocytosine. To this mixture was added 22.24 g (0.1 mole) of isophorone diisocyanate and the flask sealed from atmospheric moisture with a conical stopper. The mixture was left at ambient temperature for five days. The resulting mixture represented 0.1 mole of the quadruple hydrogen bonding entity, which would then be reacted with polymers containing phenolic —OH functionality (see *Science*, 278, 1601–1604 (1997) and in *J. Polym. Sci., Part A: Polym. Chem.*, 37, 3657–3670 (1999).

Stage 2

110.75 g of Bakelite resin LB6564 was dissolved into 400 g of dried tetrahydrofuran (THF) in a 1 liter flask and 40% of the stage 1 mixture (0.04 moles of QHBE) added slowly with stirring. Slow stirring was continued for 1–2 days at ambient temperature. The mixture was tested for isocyanate functionality using FT-IR. The reaction was considered to be complete when the presence of an isocyanate functionality could no longer be detected by Infrared Spectroscopy (IR).

Chemical Reactions: Preparation of QHB-functional Phenolic Resin

The QHB-functional phenolic resin and quadruple H-bonded unit resulting therefrom are represented schematically below. Phenolics having 2 QHB units will undergo chain extension, whereas phenolics having 3 or more QHB units are capable of undergoing crosslinking.

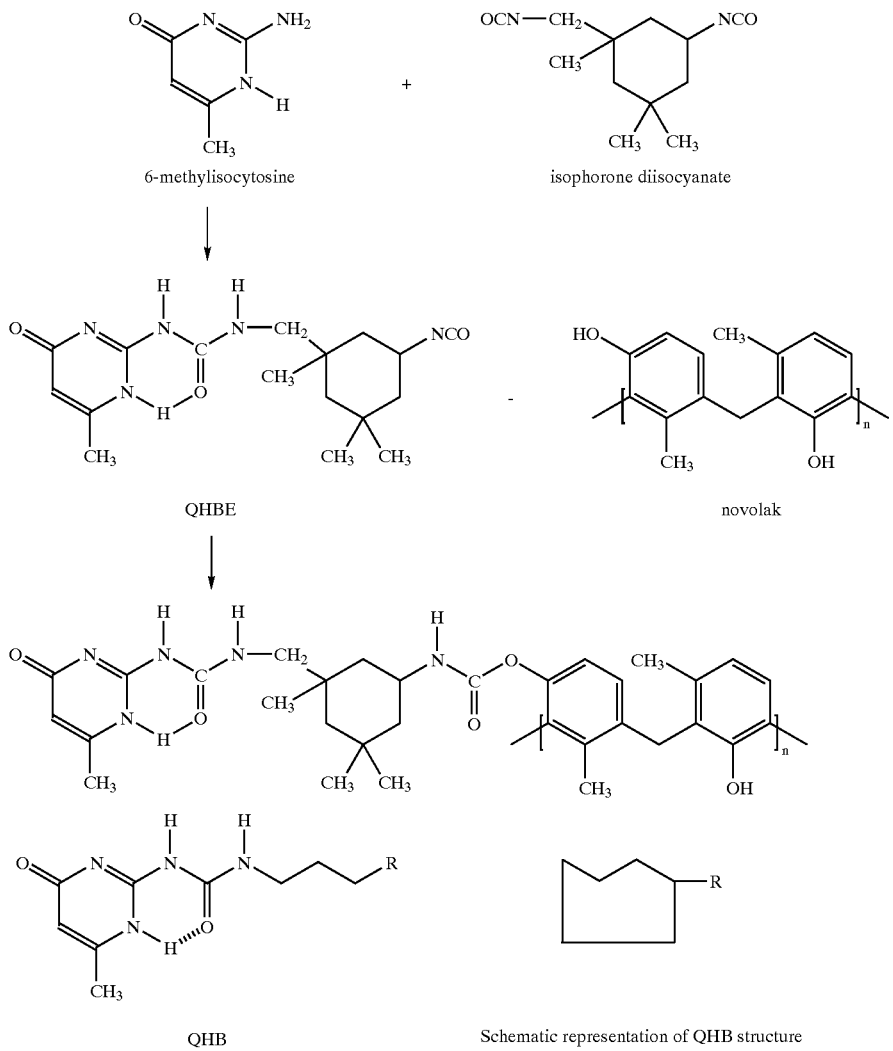

The QHB group can form a four centered H-bond as shown below:

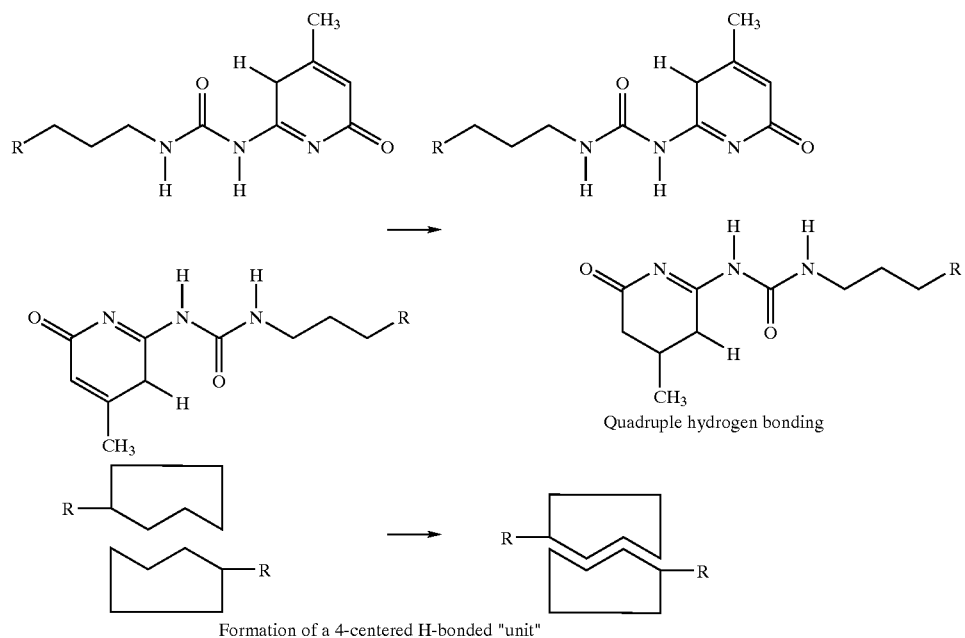

Formation of a 4-centered H-bonded "unit"

Isolation of the QHB Polymer

The product was isolated by precipitation into water. The mixture was slowly poured as a thin stream into 5 liters of vigorously stirred distilled water using a Silverson/Rotamix mixer. Initially, the product precipitated as a sticky viscous mass, but tended to harden and crumble with further stirring as the tetrahydrofurane (THF) was extracted from the polymer. The aqueous phase was decanted and replaced with fresh water and left over-night. The mixture was again vigorously stirred to form a fine precipitate, which was washed with water while being filtered, using a Buchner funnel. The damp cake was crumbled into a drying tray and dried at 40° C. until constant weight was obtained.

TABLE A

| Resin | LB6564 | Lyncur M (S-1) | Lyncur CBA |
|---|---|---|---|
| Phenolic Resin (equiv. wt) | 116.43 | 108.14 | 262.15 |
| Phenolic Resin (equivalents) | 0.9512 | 0.476 | 0.238 |
| Resin weight (g) | 110.75 | 51.43 | 62.34 |
| QHBE (moles) | 0.04 | 0.02 | 0.01 |
| QHBE weight(g) | 13.91 | 6.954 | 3.477 |
| QHBE Solvent | T.H.F. | T.H.F. | T.H.F. |
| PHENOL/QHBE equiv ratio | 23.78 | 23.78 | 23.78 |
| Solvent | T.H.F. | T.H.F. | T.H.F. |
| Solvent weight (g). | 400 | 200 | 250 |
| Yield (g). | 119.7 | 32 | 46.4 |
| Batch name | RESIN A | RESIN B | RESIN C |

Definitions:

1. LB6564: a phenol/cresol novolak marketed by Bakelite, UK.

2. M(S-1): Lyncur M(S-1), a polyvinylphenol polymer having Mw=1600 to 2400 and Mn=1100 to 1500, as supplied by Siber Hegner, Beckenham, UK.

3. CBA: Lyncur CBA (PVPh-butylacrylate), a copolymer of polyvinylphenol having the structure:

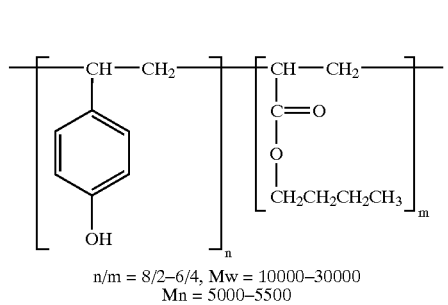

n/m = 8/2–6/4, Mw = 10000–30000
Mn = 5000–5500

4. RESIN A: the resin obtained when 110.75 g of LB6565 is reacted with 13.91 g of QHBE.

5. RESIN B: the resin obtained when 51.43 g of M(S-1) is reacted with 6.954 g of QHBE.

6. RESIN C: the resin obtained when 62.34 g of Lyncur CBA resin is reacted with 3.477 g of QHBE.

7. KF654B PINA: an IR dye as supplied by Riedel de Haan Ltd, Middlesex, UK, having the following structure:

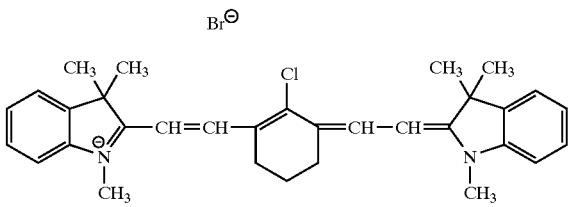

8. IR dye B: an IR dye having the structure:

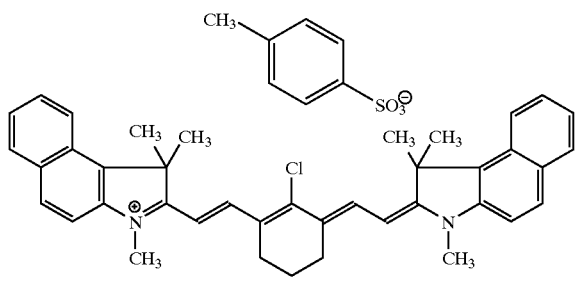

9. Crystal violet: basic violet 3, C.I. 42555, Gentian violet, as supplied by Aldrich Chemical Company, Dorset, UK.

10. Oxonol Blue: a blue dye having the structure:

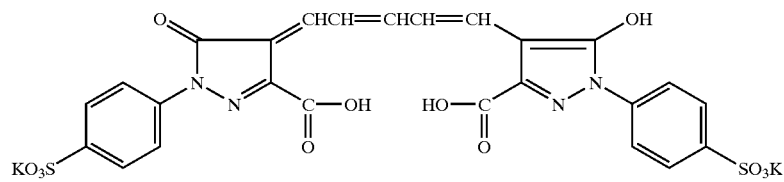

11. Paris Blue: a blue pigment supplied by Kremer Pigmente, Aichstetten, Germany.

12. Developer A: 14% wt sodium metasilicate pentahydrate in water.

13. Developer B: 0.2M NaOH in water.

14. Copper substrate A: double sided copper laminate of overall thickness 254 microns, having copper cladding 18 microns thick on each side of an insulating substrate, catalogue number N4105-2, 0.008, H/H THE, as supplied by New England Laminates (UK) Ltd of Skelmersdale, UK. The copper substrate is then brush grained using a mechanical grainer, stock number 4428, supplied by PCB machinery Ltd, Haslingden, Rossendale, UK, rinsed with distilled water for 10 seconds and allowed to air dry, prior to coating.

15. Etching solution A: Ferric chloride hexahydrate crystals, catalogue no. 551-227 as supplied by RS components, Corby, UK.

16. Stripper A: Catalogue no. 690-855 as supplied by RS components.

Plate Examples and Press Test Result:

Formulation A and B solution concentrations were selected to provide the specified dry film compositions with coating weights of 2 g/m$^2$ after thorough drying, at 100° C. for 90 seconds in a Mathis oven. In each case the substrate used was an aluminum sheet that had been electrograined and anodised and post-anodically treated with an aqueous solution of an inorganic phosphate. The coating solutions were coated onto the substrate by use of a wire wound bar.

For formulation A, RESIN A (see Table A) and IR dye B were used in the ratio of 98:2 (w:w). For formulation B, Paris Blue, and RESIN A (at a ratio of 1:4, w:w) were ball milled together for 4 days such that the dispersed mill base had a solids content of 30 wt % in 1-methoxypropan-2-ol and a particle size of <10 microns as determined by grind gauge. Thus, the formulation B coating was prepared as a solution on 1-methoxypropan-2-ol.

|  | Formulation | |
|---|---|---|
|  | A | B |
|  | Parts by Weight | |
| RESIN A | 98 | 80 |
| IR dye B | 2 | |
| Paris Blue |  | 20 |

The precursors were imaged using an internal test pattern, on a Creo Trendsetter at an imaging energy density of 250 mJ/cm$^2$. They were then processed using a Kodak Polychrome Graphics Mercury Mark V processor containing developer A at 22.5° C. at a process speed of 750 mm/min. Performance was assessed by comparing actual screen densities with expected densities using a Gretag D19C. densitometer (available from Colour Data Systems Ltd, The Wirral, UK).

Density Results:

| Expected Dot Readings/% | Actual Dot Readings/% | |
|---|---|---|
|  | Formulation A | Formulation B |
| 2 | 2 | 1 |
| 5 | 6 | 5 |
| 10 | 10 | 10 |
| 20 | 21 | 20 |
| 30 | 31 | 30 |
| 40 | 40 | 40 |
| 50 | 51 | 50 |
| 60 | 57 | 59 |
| 70 | 72 | 69 |
| 80 | 81 | 79 |
| 90 | 92 | 90 |
| 95 | 97 | 95 |

The printing forms were press tested on a Heidelberg Speed Master 52 printing press, using Duo laser 80 g paper, Gibbons Geneva A1 color ink and a standard fount solution (including 87% water, 10.5% isopropyl alcohol and 2.5% Goldfount surfactants). Each printing form ran cleanly, with no inking in background areas. Density tests were carried out on the solid image areas (100% screen areas) at a range of runlenghts. Formulations A and B maintained 100% screen density beyond 23,000 impressions and the plates ran cleanly on press. There was no evidence of coating failure throughout the printing test.

Latent Image Stability:

Coating formulation C was prepared as a solution in 1-methoxypropan-2-ol. The solution concentration was selected to provide the specified dry film composition of 2% IR dye B and 98% RESIN A with a coating weight of 2 g/m$^2$ after thorough drying at 100° C. for 90 seconds. The precursor was then imaged using an internal test pattern with 100% coverage, on a Creo Trendsetter 3244 at an imaging energy density of 220 mJ/cm$^2$. Next, separate samples of this precursor were cut up and the time between imaging and developing was increased (0, 1, 2, 3 and 4 hours). Additional samples were stored at elevated temperature (40° C.) for 0, 4 and 21 hours. Samples were then processed using a Kodak Polychrome Graphics Mercury Mark V processor containing developer A at 22.5° C. at a process speed of 750 mm/min. In this way, the latent image stability of the formulation was evaluated using a Gretag densitometer.

Latent Image Stability Results, Room Temperature Storage:

| Formulation C | Time between imaging and developing/hours | | | | |
|---|---|---|---|---|---|
| Expected dot readings/% | 0 | 1 | 2 | 3 | 4 |
| | Actual dot readings/% | | | | |
| | 0 | 0 | 62 | 70 | 86 | 96 |

Latent Image Stability Results, 40° C. Storage:

| Formulation C | Time between imaging and developing/hours | | |
|---|---|---|---|
| Expected dot readings/% | 0 | 4 | 21 |
| | Actual dot readings/% | | |
| | 0 | 0 | 100 | 100 |

Developer Resistance Tests:

The solution concentrations were selected to provide the specified dry film compositions with coating weights of 2 g/m$^2$ after thorough drying, at 100° C. for 90 seconds in a Mathis oven. In each case the substrate used was an aluminum sheet that had been electrograined and anodised and post-anodically treated with an aqueous solution of an inorganic phosphate. The coating solutions were coated onto the substrate by use of a wire wound bar.

| | Formulation | | |
|---|---|---|---|
| | D | E | F |
| | Parts by Weight | | |
| RESIN A | 98 | 98 | 100 |
| IR dye B | 2 | | |
| Oxonol Blue | | 2 | |

| | Formulation | | |
|---|---|---|---|
| | G | H | I |
| | Parts by Weight | | |
| RESIN B | 98 | 98 | 100 |
| IR dye B | 2 | | |
| Oxonol Blue | | 2 | |

| | Formulation | | |
|---|---|---|---|
| | J | K | L |
| | Parts by Weight | | |
| RESIN C | 98 | 98 | 100 |
| IR dye B | 2 | | |
| Oxonol Blue | | 2 | |

Precursor samples were then developed for increasing amounts of time at different ages, with developer A at 25° C. and a visual assessment was made of whether any coating remained, ie was the coating resisting the developer.

Fresh Plates (Non-imaged):

| Formulation | Time exposed to developer/s | | | | | |
|---|---|---|---|---|---|---|
| | 30 | 60 | 90 | 120 | 150 | 180 |
| D | Coating visible | Coating visible | Coating visible | Coating visible | Some coating left | All coating removed |
| E | Coating visible | Coating visible | Coating visible | Some coating left | All coating removed | All coating removed |
| F | Coating visible | Coating visible | Coating visible | Coating visible | Some coating left | All coating removed |
| G | All coating removed | All coating removed | All coating removed | All coating removed | All coating removed | All coating removed |
| H | All coating removed | All coating removed | All coating removed | All coating removed | All coating removed | All coating removed |
| I | All coating removed | All coating removed | All coating removed | All coating removed | All coating removed | All coating removed |
| J | All coating removed | All coating removed | All coating removed | All coating removed | All coating removed | All coating removed |
| K | All coating removed | All coating removed | All coating removed | All coating removed | All coating removed | All coating removed |
| L | All coating removed | All coating removed | All coating removed | All coating removed | All coating removed | All coating removed |

"Coating visible"=coating is unattacked by developer
"Some coating left"=coating is partially dissolved by developer
"All coating is removed"=developer has dissolved coating away 1 Day Old Plates, Stored at Ambient (Non-imaged):

| Formulation | Time exposed to developer/s ||||||||| 
|---|---|---|---|---|---|---|---|---|---|
| | 120 | 150 | 180 | 210 | 240 | 270 | 300 | 330 | 360 |
| D | Coating visible | Coating visible | Coating visible | Coating visible | Some coating left | Some coating left | Some coating left | Some coating left | All coating removed |
| E | Some coating left | Some coating left | Some coating left | Some coating left | Some coating left | Some coating left | All coating removed | All coating removed | All coating removed |
| F | Coating visible | Coating visible | Coating visible | Coating visible | Coating visible | Some coating left | All coating removed | All coating removed | All coating removed |

All coating was removed from Formulations G through L.

5 Day Old Plates, Stored at Ambient (Non-imaged):

| Formulation | Time exposed to developer/s ||||||||| 
|---|---|---|---|---|---|---|---|---|---|
| | 120 | 150 | 180 | 210 | 240 | 270 | 300 | 330 | 360 |
| D | Coating visible | Coating visible | Coating visible | Coating visible | Coating visible | Coating visible | Coating visible | Coating visible | Some coating left |
| E | Coating visible | Coating visible | Coating visible | Some coating left | Some coating left | Some coating left | Some coating left | Some coating left | Some coating left |
| F | Coating visible | Coating visible | Coating visible | Coating visible | Coating visible | Coating visible | Some coating left | Some coating left | Some coating left |

All coating was removed from Formulations G through L.

3 Day Old Plates, Stored at 40° C. (Non-imaged):

| Formulation | Time exposed to developer/s ||||||||| 
|---|---|---|---|---|---|---|---|---|---|
| | 120 | 150 | 180 | 210 | 240 | 270 | 300 | 330 | 360 |
| D | Coating visible | Coating visible | Coating visible | Coating visible | Coating visible | Coating visible | Coating visible | Coating visible | Coating visible |
| E | Coating visible | Coating visible | Coating visible | Coating visible | Coating visible | Some coating left | Some coating left | Some coating left | Some coating left |
| F | Coating visible | Coating visible | Coating visible | Coating visible | Coating visible | Coating visible | Coating visible | Coating visible | Coating visible |

All coating was removed from Formulations G through L.

6 Day Old Plates, Stored at 40° C. (Non-imaged):

| Formulation | Time exposed to developer/s ||||||||| 
|---|---|---|---|---|---|---|---|---|---|
| | 120 | 150 | 180 | 210 | 240 | 270 | 300 | 330 | 350 |
| D | Coating visible | Coating visible | Coating visible | Coating visible | Coating visible | Coating visible | Coating visible | Coating visible | Coating visible |
| E | Coating visible | Coating visible | Coating visible | Coating visible | Coating visible | Some coating left | Some coating left | Some coating left | Some coating left |
| F | Coating visible | Coating visible | Coating visible | Coating visible | Coating visible | Coating visible | Coating visible | Coating visible | Coating visible |

Formulations G through I were not tested. All coating was removed from Formulations J through L.

As shown in Table A, the QHBE/phenol group equivalent ratio is about 1/24 in these formulations. Developer resistance as a function of QHBE level was also determined, using a series of derivatives of LB6564 of different QHB level shown in the table below and compared with unmodified LB6564.

| QHBE:phenolic OH ratio (LB6564) | 01:05 | 01:08.4 | 01:14 | 01:24 | 01:40 | LB6564 |
|---|---|---|---|---|---|---|
| Resin % | 98 | 98 | 98 | 98 | 98 | 98 |
| IR dye B % | 2 | 2 | 2 | 2 | 2 | 2 |
| Goldstar removal time (seconds) | >300 | >300 | >300 | 180 | 70 | 5 |

These results show that increasing levels of QHBE enhance developer resistance. Accordingly, those skilled in the art will be able to adjust the QHB/Resin ratio to provide an appropriate resistance for resins used in practicing the present invention, such as resins C and D.

2-Layer Plate Example with QHB in the Top Layer

Stage 1:

Synthesis of the Quadruple Hydrogen Bonding Entity (QHBE):

Dry 6-methylisocytosine (13.78 g) (0.11 mole) and dry 2-butanone (MEK) (100 g) were charged into a 250 mL flask under $N_2$ atmosphere. With the temperature held constant at 30° C., isophorone diisocyanate (22.24 g) (0.1 mole) was added dropwise, after which the temperature was raised to 45° C. and the reaction was continued for 8 hr. The % unreacted NCO was determined by titration to be 13.0 (11.7 theoretical), corresponding to 0.1 mole QHBE (26.5% solids).

Stage 2:

Preparation of QHB-Functional Phenolic Resin:

Novolac resin LB-6564 (110.8 g) and tin octoate (0.4 g) were dissolved in dry MEK in a 1-L flask, followed by the addition of QHBE (48.5 g, corresponding to 40 wt % of the stage 1 product) (0.04 mol) over a period of 1 hr with stirring. After heating under $N_2$ for 8 hr at 80° C., all of the NCO functionality was reacted, as determined by titration.

The MEK was removed by rotary evaporation and replaced by 2-methoxyethanol (100 g). The resulting mixture was slowly poured as a thin stream into distilled water (5 L), which was vigorously stirred using a Silverson/Rotamix mixer. The resulting damp cake was dried at 40° C. to provide the QHB-functional phenolic resin, UR 4309.

Plate Preparation and Evaluation

A formulation of copolymer ACR-1478 (described below) (4.25 g) and IR dye B (0.75 g), dissolved in a mixture of dioxalane (43 g), methanol (43 g) and methyl lactate (14 g) was spin coated onto a lithographic aluminum substrate to provide a dry coating wt of 1.4 $g/m^2$. The plate substrate had been electrolytically grained, anodized and hydrophilized with polyvinyl phosphonic acid prior to coating.

A solution of the QHB-phenolic resin UR 4309 (3 g) in a mixture of toluene (70 g) and 2-methoxypropanol (30 g) was spin coated onto the above coated substrate to provide a second layer, having a dry coating wt of 0.7 $g/m^2$.

The composite printing plate precursor was further dried for at 95° C. for 3 min and imagewise exposed to a dose of 150 $mJ/cm^2$, using a Creo trendsetter 3244 at a 10W power setting. The imaged plate precursor was processed in a PC32 processor (available from Kodak Polychrome Graphics), using Kodak Polychrome Graphics developer 956.

One pass through the processor at a speed of 2 m/min resulted in complete removal of the imagewise exposed areas and provided the imaged plate having an excellent image and a clean background.

The image quality remained good after a second pass through the processor, which demonstrated good processor latitude. The plate precursor was also shown to be white-light safe.

Preparation of Copolymer ACR-1478

Dioxalane (75 g), 95% ethanol (75 g), methacrylic acid (14.7 g), N-phenylmaleimide (59.1 g) and methacrylamide (26 g), followed by dioxalane (75 g) and ethanol (75 g), were charged into a 4-neck, 4-L flask, equipped with a mechanical stirrer, condenser, temperature controller and nitrogen purge. The reaction mixture was heated to 60° C., using a heating mantle. Azo-bis-isobutyronitrile (Vazo-64, from DuPont) (0.135 g) was added and the reaction was maintained at 60° C. for 22 hr. After cooling to room temperature, the reaction mixture was slowly poured onto a mixture of ethanol (1.22 kg) and distilled water (250 g) contained in a 2-gallon plastic container over a period of 45 min and then stirred for 30 min. The precipitated product was filtered, re-suspended in ethanol (920 g), filtered and dried at 40° C. overnight.

The ACR-1478 copolymer of methacrylic acid: N-phenylmaleimide: methacrylamide (20.9: 41.6: 37.4 mol %) exhibited an acid number of about 96.

PCB Example:

The coating formulation M was prepared as a solution in 1-methoxypropan-2-ol/DMF (75%: 25%, v:v). The substrate used was copper substrate A. The coating solution was coated onto one side of the copper substrate by means of a wire wound bar. The solution concentration was selected to provide the specified dry film composition with a coating weight of 4 $g/m^2$ after thorough drying at 130° C. for 150 seconds.

| Coating Formulation M | |
|---|---|
| Component | Parts by Weight |
| RESIN BB | 40 |
| CBA, 30k | 57.65 |
| Crystal violet | 1 |
| KF654B | 1.35 |

A sample of the printed circuit board precursor was imaged on the Trendsetter 3244, using the internal test pattern, plot 0 at 400 $mJ/cm^2$. The exposed precursor was then processed by immersion in developer B for 30 seconds at 20° C. At this imaging and developing condition, the 50% dots laid down by the imagesetter were complete 50% dots on the substrate.

The precursor was then etched (uncovered copper removed) by immersion in the etching solution A, diluted with water (50% w:w) which was constantly being stirred, for between 5 and 10 minutes at 40° C. The precursor was then rinsed with water.

Finally, the precursor was cleaned by immersion in Stripper A diluted with water (20% w:w) (to remove the remaining coating) at 20° C. for 60 seconds. The printed circuit board sample had a copper pattern remaining that was an accurate copy of the precursor above after the development stages.

2-Layer Plate Example with QHB in the Bottom Layer

| Components of the Tap Layer (wt %) | T1 | T2 | T3 |
|---|---|---|---|
| 1-Methoxy-2-propanol | 64.7 | 64.7 | 64.7 |
| Methanol | 27.7 | 27.7 | 27.7 |
| QHB-functional Cresol Novolak (RESIN 1) | 7.1 | | |
| QHB-functional Cresol Novolak (RESIN 2) | | 7.1 | |
| Cresol Novolak | | | 7.1 |
| D-11 | 0.1 | 0.1 | 0.1 |
| DC19O (10% PGME sol.) | 0.4 | 0.4 | 0.4 |

| Components of the Bottom Layer (wt %) | B1 | B2 | B3 | B4 | B5 | B6 | B7 | B8 |
|---|---|---|---|---|---|---|---|---|
| Methyl Cellosolve | 90.6 | 90.6 | 90.6 | 90.6 | 90.6 | 90.6 | 90.6 | 90.6 |
| Pure Water | 0.9 | 0.9 | 0.9 | 0.9 | 0.9 | 0.9 | 0.9 | 0.9 |
| QHB-functional Cresol Novolak (RESIN 1) | 2.0 | 2.0 | 2.0 | 2.0 | 2.0 | 7.0 | | |
| Acrylic Resin (RESIN AA) | 5.0 | | | | | | | |
| QHB-functional Acrylic Resin (RESIN BB) | | 5.0 | | | | | | |
| QHB-functional Acrylic Resin (RESIN CC) | | | 5.0 | | | | | |
| QHB-functional Acrylic Resin (RESIN DD) | | | | 5.0 | | | | |
| QHB-functional Acrylic Resin (RESIN EE) | | | | | 5.0 | | 5.0 | |
| Cresol Novolak | | | | | | | 2.0 | 7.0 |
| D-11 | 0.1 | 0.1 | 0.1 | 0.1 | 0.1 | 0.1 | 0.1 | 0.1 |
| DC190 (10% PGME sol.) | 0.4 | 0.4 | 0.4 | 0.4 | 0.4 | 0.4 | 0.4 | 0.4 |
| KF654 (pts) | 1.0 | 1.0 | 1.0 | 1.0 | 1.0 | 1.0 | 1.0 | 1.0 |

Stage 1
Synthesis of 6-Methylisocytosine

Into a 1 liter flask 600 ml of dried Ethanol and 91.89 g (0.51 mol) of Guanidine Carbonate and 146.1 g (1.11 mol) of ethyl acetoacetate were added. The reaction solution was gradually heated to reflux temperature and stirred overnight. 300 ml of Ethanol was evaporated and reaction solution was heated under reflux for two hours. After cooling, 300 ml of Hexane was added. Deposit was filtered, washed and dried. 119.3 g of 6-methylisocytosine was obtained.

Synthesis of the Quadruple Hydrogen Bonding Entity (QHBE)

Into a 300 ml flask 200 g of dried N,N-dimethylacetamide (DMA) and 27.56 g (0.22 mol) of 6-methylisocytosine were added. To this mixture 46.65 g (0.21 mol) of isophorone diisocyanate was added and the flask was sealed from atmospheric moisture with a conical stopper. The mixture was left at ambient temperatures for five days.

Stage 2
Synthesis of QHB-functional m/p-Cresol Novolak (RESIN 1)

27.7 g of m/p-cresole novolak (m/p ratio of 6:4; weight average molecular weight: 5,600) was dissolved into 100 ml of dried N,N-dimethyl acetamide in a 200 ml flask. 40% of the stage 1 mixture (0.04 mole of QHBE) and 0.05 g of di-n-butyltin dilaurate were added slowly with stirring. Stirring was continued for 1 day at 80° C. The mixture was tested for isocyanate functionality using back titration by addition of N,N-dibutylamine. The mixture was poured into 1 liter of water. The deposit was filtered, washed and dried to produce 27.8 g of QHB-functional m/p-cresol novolak.

Synthesis of QHB-functional m-Cresol Novolak (RESIN 2)

27.7 g of m-cresole novolak (weight average molecular weight: 5,300) was dissolved into 100 ml of dried N,N-dimethyl acetamide in a 200 ml flask. 40% of the stage 1 mixture (0.04 mole of QHBE) and 0.05 g of di-n-butyltin dilaurate were added slowly with stirring. Stirring was continued for 1 day at 80° C. The mixture was tested for isocyanate functionality using back titration by addition of N,N-dibutylamine. The mixture was poured into 1 liter of water. The deposit was filtered, washed and dried to produce 31.07 g of QHB-functional m-cresol novolak.

Stage 3
Synthesis of N-(4-Carboxyphenyl)methacrylamide (MONOMER 1)

Into a 1 liter flask 600 ml of acetonitrile, 95.2 g (1.1 mol) of methacrylic acid and 120.1 g (1.1 mol) of chloroformic acid ethyl ester were added. To this mixture 111.8 g (1.1 mol) of triethylamine was added over a period of 1 hour in a cold bath. Stirring was continued for 1 hour at room temperature. 137.1 g (1 mol) of 4-aminobezoic acid was added to the mixture. The mixture was heated for 2 hours at 50° C. The mixture was poured into 5 liter of 1% HCl solution. The deposit was filtered, washed and dried to produce 170.9 g of N-(4-carboxyphenyl)-methacrylamide.

Synthesis of 2-(N'-(4-Hydroxyphenyl)ureido) ethylmethacrylate (MONOMER 2)

Into a 1 liter fask 500 g of N,N-Dimethyl acetamide and 173.5 g (1.6 mole) of p-aminophenol were added. This mixture was placed in cold bath and 234.9 g (1.5 mole) of methacryloyl oxyethyl isocyanate was added over a period of 1 hour. After the addition was complete, stirring was continued for 5 hours at room temperature. The mixture was tested for isocyanate functionality using IR spectroscopy. 30 ml of concentrated HCl was added to the mixture and was stirred for 15 minutes. The mixture was poured into 4.5 liter of water. The deposit was filtered, washed and dried to produce 370 g of 2-(N'-(4-hydroxyphenyl)ureido)ethyl methacrylate.

Synthesis of N-(3-Carboxy-4-hydroxyphenyl) methacrylamide (MONOMER 3)

Into a 1 liter flask were added 600 ml of acetonitrile, 95.2 g (1.1 mol) of methacrylic acid and 120.1 g (1.1 mol) of chloroformic acid ethyl ester. To this mixture 111.8 g (1.1 mol) of triethylamine was added over a period of 1 hour in a cold bath. Stirring was continued for 1 hour at room temperature and 141.2 g (1 mol) of 5-aminosalicylic acid was added. The mixture was heated for 2 hours at 60° C. The mixture was poured into 5 liter of 1% HCl solution. The deposit was filtered, washed and dried to produce 164.7 g of N-(3-carboxy-4-hydroxyphenyl)methacrylamide.

Synthesis of N-(4-Hydroxyphenyl)methacrylamide (MONOMER 4)

Into a 1 liter flask 600 ml of acetonitrile, 95.2 g (1.1 mol) of methacrylic acid and 120.1 g (1.1 mol) of chloroformic acid ethyl ester were added. To this mixture 111.8 g (1.1 mol) of triethylamine was added over a period of 1 hour in cool bath. Stirring was continued for 1 hour at room temperature and 120.0 g (1 mol) of p-aminophenol was added. The mixture was heated for 5 hours at 5020 C. The mixture was poured into 5 liter of 1% HCl solution. The deposit was filtered, washed and dried to produce 99.35 g of N-(4-Hydroxyphenyl)methacrylamide.

Stage 4
Synthesis of Acrylic Resin AA (RESIN AA)

Into a 200 ml flask 46.7 g of N,N-dimethylacetamide was added and heated at 85° C. Then, 0.15 g of AIBN was added under a nitrogen atmosphere. A mixture of 46.7 g of N,N-Dimethylacetamide, 15.6 g of N-(4-Carboxyphenyl) methacrylamide, 18.5 g of acrylonitrile, 1.5 g of methacrylamide, 1.5 g of phenylmaleimide and 0.45 g of AIBN was added over a period of 1 hour. The mixture was then heated at 100° C. and 0.15 g of AIBN was added at intervals of 1 hour till viscosity B~C (Gardner density) was obtained. The mixture was poured into 1.5 liter of water, the deposit was filtered, washed and dried to produce 34.25 g of acrylic resin AA (Acid Value: 115).

Synthesis of QHB-functional Acrylic Resin BB (RESIN BB)

Into a 200 ml flask 46.7 g of N,N-dimethyl acetoamide was added and heated to 85° C. Under nitrogen atmosphere 0.15 g of AIBN was added. Next, a mixture of 46.7 g of N,N-dimethyl acetamide, 16.7 g of N-(4-carboxyphenyl) methacrylamide, 16.7 g of acrylonitrile, 1.7 g of phenylmaleimide, 2.0 g of 2-(N'-(4-hydroxyphenyl)ureido) ethyl methacrylate and 0.45 g of AIBN was added over a period of 1 hour. After the addition was complete, the mixture was heated to 100° C. and 0.15 g of AIBN was added at 1 hour intervals till a viscosity of B~C (Gardner density) was obtained. The mixture was cooled to 80° C. 4.3 g of QHBE solution, 0.05 g of di-n-butyltin dilaurate and 0.1 g of triethylamine were added and the mixture was allowed to react for 8 hours. The progress of the reaction was monitored using GPC by determining the amount of isocyanate functionality present in the mixture. When the reaction was complete, the mixture was poured into 1.5 liter of water. The deposit was filtered, washed and dried to produce 32.7 g of QHB-functional acrylic resin BB (Acid Value:115).

Synthesis of QHB-functional Acrylic Resin CC (RESIN CC)

Into a 200 ml flask 46.7 g of N,N-Dimethylacetamide was added and heated at 85° C. 0.15 g of AIBN was added under a nitrogen atmosphere. A mixture of 46.7 g of N,N-dimethylacetamide, 14.5 g of N-(4-carboxyphenyl) methacrylamide, 16.7 g of acrylonitrile, 1.7 g of phenylmaleimide, 4.2 g of N-(3-carboxy-4-hydroxyphenyl) methacrylamide and 0.45 g of AIBN was then added over a period of 1 hour. The mixture was heated to 100° C. an 0.15 g of AIBN was added at intervals of 1 hour till a viscosity of B~C (Gardner density) was obtained. The mixture was cooled to 80° C. and 10.7 g of QHBE solution, 0.05 g of di-n-butyltin dilaurate and 0.1 g of triethylamine were added and the mixture was allowed to react for 8 hours. The progress of the reaction was monitored using GPC by determining the amount of isocyanate functionality present in the mixture. When the reaction was complete, the mixture was poured into 1.5 liter of water. The deposit was filtered, washed and dried to produce 34.1 g of QHB-functional acrylic resin CC (Acid Value:115).

Synthesis of QHB-functional Acrylic Resin DD (RESIN DD)

Into a 200 ml flask 46.7 g of N,N-Dimethylacetamide and heated at 85° C. was added. 0.15 g of AIBN was then added under a nitrogen atmosphere. A mixture of 46.7 g of N,N-dimethylacetamide, 17.0 g of N-(4-carboxyphenyl) methacrylamide, 16.7 g of acrylonitrile, 1.7 g of phenylmaleimide, 4.2 g of N-(4-hydroxyphenyl) methacrylamide and 0.45 g of AIBN was added over a period of 1 hour. The mixture was heated at 100° C. and 0.15 g of AIBN was added at intervals of 1 hour till a viscosity of B~C (Gardner density) was obtained. The mixture was cooled to 80° C. 5.4 g of QHBE solution, 0.05 g of di-n-butyltin dilaurate and 0.1 g of triethylamine were added and was reacted for 8 hours. The progress of the reaction was monitored using GPC by determining the amount of isocyanate functionality present in the mixture. When the reaction was complete, the mixture was poured into 1.5 liter of water. The deposit was filtered, washed and dried to produce 33.1 g of QHB-functional acrylic resin DD (Acid Value:115).

Synthesis of QHB-functional Acrylic Resin EE (RESIN EE)

Into a 200 ml flask was added 46.7 g of N,N-Dimethylacetamide and heated at 85° C. 0.15 g of AIBN was added under a nitrogen atmosphere. A mixture of 46.7 g of N,N-dimethylacetamide, 17.0 g of N-(4-carboxyphenyl) methacrylamide, 18.9 g of acrylonitrile, 3.1 g of 2-hydroxyethyl methacrylate and 0.45 g of AIBN was added over 1 hour. The mixture was heated to 100° C. and 0.15 g of AIBN was added at 1 hour intervals till a viscosity of B~C (Gardner density) was obtained. The mixture was cooled to 80° C. and 13.4 g of QHBE solution and 0.05 g of di-n-butyltin dilaurate were added. The mixture was allowed to react for 8 hours. The progress of the reaction was monitored using GPC by determining the amount of isocyanate functionality present in the mixture. After THE USUAL workup, a 36.6 g of QHB-functional acrylic resin EE (Acid Value:115) was obtained.

The coating solutions were applied using a roll-coater and the coatings produced were dried for 2 minutes at 100° C. Coating weight of the top layer and bottom layer were 0.7 g/m$^2$ and 1.5 g/m$^2$, respectively. The aluminum sheet substrate of was electrolytically grained, anodized and treated with silicate.

These plates were exposed to IR radiation (Trendsetter 3244: 9W, 150 rpm) and developed by PD-1(1/5~1/11)(30° C., 20 sec).

| | Evaluation | | | | |
|---|---|---|---|---|---|
| | Top Layer | Bottom Layer | Developing Latitude | Press Life (sheet) | Solvent Resistance |
| Example 1 | T1 | B1 | 3–4 | ≧100,000 | 5 |
| Example 2 | T1 | B2 | 4 | ≧100,000 | 4 |
| Example 3 | T1 | B3 | 4 | ≧100,000 | 4 |
| Example 4 | T1 | B4 | 4 | ≧100,000 | 4 |
| Example 5 | T1 | B5 | 5 | ≧100,000 | 5 |
| Example 6 | T1 | B6 | 4 | 80,000 | 2 |
| Example 7 | T1 | B7 | 3–4 | ≧100,000 | 5 |
| Example 8 | T2 | B5 | 3–4 | ≧100,000 | 5 |
| Example 9 | T3 | B1 | 3 | ≧100,000 | 5 |
| Comparative example 1 | T1 | B8 | 2 | 40,000 | 1 |
| Comparative example 2 | T3 | B8 | 1 | 20,000 | 1 |

Range of evaluation results: 5 = Excellent to 1 = Poor

Developing latitude was evaluated by density difference of 50% dot developed by 6 part diluted solutions (A) of PD-1 and 12 part diluted solutions (B) of PD-1. Therefore, if density difference (B-A) of 50% dot evaluated by (A) and (B) was small, the influence of the developer concentration was also small, which meant that the printing plate had a wide developing latitude.

Press life was evaluated as follows: the printing plates were affixed to a ROLAND R-700 printing machine, and printing was carried out with the UV ink DICURE Scepter Black (manufactured by Dainippon Ink & Chemicals, Inc.), and 100 part diluted solutions of fountain solution NA-108W (manufactured by Dainippon Ink & Chemicals, Inc.). Evaluation was made based on the final number of printed pages obtained that had accurate printing.

Solvent resistance was evaluated by soaking the printing plates in Daicure washer and Daicure roller washer (manufactured by Dainippon Ink & Chemicals,Inc.) for 30 min., and evaluating the degree of corrosion of the printing plates.

The present invention has been described with particular reference to the preferred embodiments. It should be understood that variations and modifications thereof can be devised by those skilled in the art without departing from the spirit and scope of the present invention. Accordingly, the present invention embraces all such alternatives, modifications and variations that fall within the scope of the appended claims.

What is claimed is:

1. An imageable element comprising:
   a substrate;
   a top layer comprising: (a) a first thermally imageable composition comprising a first thermally sensitive supramolecular polymer which exhibits an increased solubility in an aqueous developer solution upon exposure to heat; the first thermally sensitive supramolecular polymer comprising: at least one covalently bonded unit; and at least one thermally reversible non-covalently bonded unit, which includes a two or more centered H-bond within each non-covalently bonded unit or (b) a thermally imageable composition free of the first thermally sensitive supramolecular polymer; and
   disposed between the substrate and the top layer, a bottom layer comprising a second thermally imageable composition comprising a second thermally sensitive supramolecular polymer which exhibits an increased solubility in an aqueous developer solution upon exposure to heat; the second thermally sensitive supramolecular polymer comprising: at least one covalently bonded unit; and at least one thermally reversible non-covalently bonded unit, which includes a three or more centered H-bond within each non-covalently bonded unit.

2. The imageable element of claim 1, wherein the top layer comprises the first thermally sensitive supramolecular polymer, and wherein the thermally reversible non-covalently bonded unit in the top layer includes a four-centered H-bond.

3. The imageable element of claim 2, wherein the four-centered H-bond in the top layer comprises two isocytosine groups.

4. The imageable element of claim 2, wherein the four-centered H-bond comprises two N,N'-diacetyl-2,6-diaminotriazine units.

5. The imageable element of claim 1, wherein the top layer comprises the first thermally sensitive supramolecular polymer, and wherein the covalently bonded unit in the top layer is derived from a polyfunctional material that is soluble or dispersible in an aqueous developer solution.

6. The imageable element of claim 5, wherein the polyfunctional material is selected from the group consisting of: polyfunctional phenolic resin, acrylic resin, polyester resin, polyurethane resin and a combination thereof.

7. The imageable element of claim 6, wherein the polyfunctional phenolic resin is selected from the group consisting of: phenol/cresol novolak, polyvinyl phenol polymer, vinyl phenol/hydxocarbyl acrylate copolymer, pyrogallol/acetone polymer and a mixture thereof.

8. The imageable element of claim 1, wherein the top layer comprises the first thermally sensitive supramolecular polymer, and wherein the first thermally sensitive supramolecular polymer in the top layer comprises a supramolecular polymer including units having the formula:

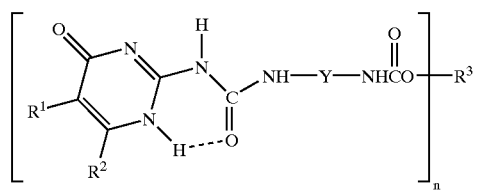

wherein each $R^1$ and $R^2$ is independently selected from the group consisting of: hydrogen and hydrocarbyl;
   wherein Y is a hydrocarbylene derived from a diisocyanate represented by the formula $Y(NCO)_2$;
   wherein $R^3$ is a phenolic residue derived from a polyfunctional phenolic resin represented by the formula $R^3(OH)_n$; and
   wherein n is at least 1.

9. The imageable element of claim 8, wherein the polyfunctional phenolic resin is selected from the group consisting of: phenol/cresol novolak, polyvinyl phenol polymer, vinyl phenol/hydrocarbyl acrylate copolymer, pyrogallol/acetone polymer and a mixture thereof.

10. The imageable element of claim 8, wherein the diisocyanate is selected from the group consisting of: isophorone diisocyanate, methylene-bis-phenyl diisocyanate, toluene diisocyanate, hexamethylene diisocyanate, tetramethylxylylene diisocyanate, dimers thereof, adducts thereof with diols, and mixtures thereof.

11. The imageable element of claim 8, wherein n is 1, 2 or 3.

12. The imageable element of claim 1, wherein the top layer comprises the first thermally sensitive supramolecular polymer, and wherein the thermally reversible non-covalently bonded unit in the top layer includes a two-centered H-bond, which comprises two 2-pyridone groups.

13. The imageable element of claim 12, wherein the first thermally sensitive supramolecular polymer comprises a supramolecular polymer derived from monomers represented by the formula:

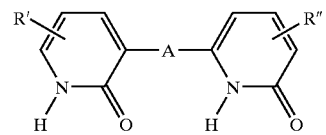

wherein each R' and R" is independently selected from the group consisting of: H, linear, branched or cyclic alkyl, aryl, aralkyl, alkaryl, substituted aryl, alkenyl, halogen, cyano, nitro, alkoxy, aryloxy, alkoxycarbonyl, amido, acyl, aminocarbonyl, carboxylic, sulfonic, imide, N-acyl sulfonamide and phenolic hydroxy with the proviso that at least one of the R' and R" groups is selected from the group consisting of: carboxylic, sulfonic, imide, N-acyl sulfonamide and phenolic hydroxy; and wherein A is a bridging group.

14. The imageable element of claim 1, wherein the top layer comprises the first thermally sensitive supramolecular polymer, and wherein the thermally reversible non-covalently bonded unit in the top layer includes a three-centered H-bond, which comprises a cyclic imide group and a 2,6-diaminotriazine group.

15. The imageable element of claim 1, wherein the top layer comprises the first thermally sensitive supramolecular polymer, and wherein the first thermally sensitive supramolecular polymer in the top layer comprises a maleimide/styrene copolymer associated with a 4-vinyl-2,6-diaminotriazine/styrene copolymer, with the proviso that the copolymers comprise at least one base-soluble functional group selected from the group consisting of: carboxylic, sulfonic, imide, N-acyl sulfonamide and phenolic hydroxy.

16. The imageable element of claim 1, wherein the thermally reversible non-covalently bonded unit in the bottom layer includes a four-centered H-bond.

17. The imageable element of claim 16, wherein the four-centered H-bond in the bottom layer comprises two isocytosine groups.

18. The imageable element of claim 16, wherein the four-centered H-bond comprises two N,N'-diacetyl-2,6-diaminotriazine units.

19. The imageable element of claim 1, wherein the covalently bonded unit in the bottom layer is derived from a polymer, which is soluble or dispersible in an aqueous developer.

20. The imageable element of claim 19, wherein the polymer comprises at least one base soluble functional group.

21. The imageable element of claim 20, wherein the base soluble functional group is selected from the group consisting of: hydroxyl, carboxylic acid, sulfonic acid, phosphoric acid, imide, N-acyl sulfonamide and a combination thereof.

22. The imageable element of claim 21, wherein the hydroxyl group is an aromatic hydroxyl group.

23. The imageable element of claim 19, wherein the polymer is formed by polymerizing a monomer mixture comprising one or more of an ethylenically unsaturated monomer having a functional group selected from the group consisting of: hydroxyl, carboxylic acid, sulfonic acid, phosphoric acid and a combination thereof.

24. The imageable element of claim 23, wherein the ethylenically unsaturated monomer is selected from the group consisting of compounds represented by the formulas:

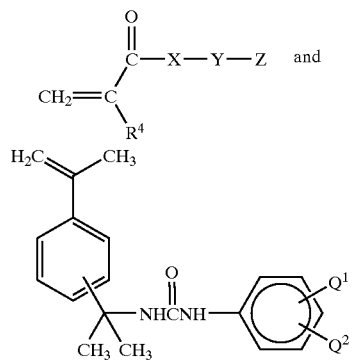

and a mixture thereof;

wherein:
each $Q^1$ and $Q^2$ is independently selected from the group consisting of: hydroxyl and carboxylic acid groups;

$R^4$ is selected from the group consisting of: hydrogen, linear, branched or cyclic alkyl of 1 to 22 carbon atoms, linear, branched or cyclic substituted alkyl of 1 to 22 carbon atoms, aryl of 6 to 24 carbon atoms and substituted aryl of 6 to 24 atoms, wherein the substituent is selected from the group consisting of: alkyl, aryl, halogen, keto, ester, alkoxy and cyano;

X is selected from the group consisting of: O, S and $NR^5$ wherein $R^5$ selected from the group consisting of: hydrogen, linear, branched or cyclic alkyl of 1 to 22 carbon atoms, linear, branched or cyclic substituted alkyl of 1 to 22 carbon atoms, aryl of 6 to 24 carbon atoms and substituted aryl of 6 to 24 atoms, wherein the substituent is selected from the group consisting of: alkyl, aryl, halogen, keto, ester, alkoxy and cyano;

Y is selected from the group consisting of: linear, branched or cyclic alkylene of 1–22 carbon atoms, alkyleneoxyalkylene, poly(alkyleneoxy)alkylene, alkylene-NHCON($R^5$)— and a bond; and Z is selected from the group consisting of: hydrogen, hydroxyl, carboxylic acid and groups represented by the formula:

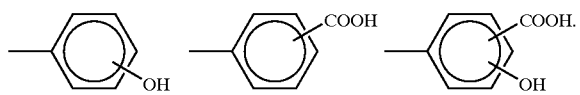

25. The imageable element of claim 24, wherein the ethylenically unsaturated monomer is selected from the group consisting of compounds represented by the formulas:

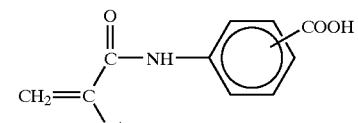

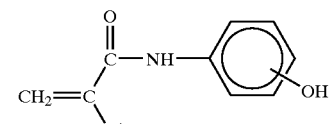

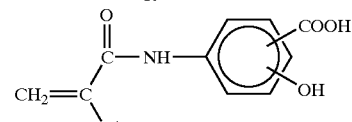
and

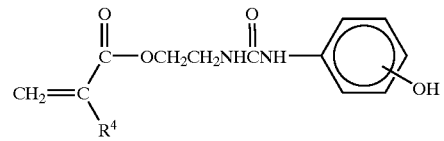

and a combination thereof.

26. The imageable element of claim 23, wherein the monomer mixture further comprises an ethylenically unsaturated comonomer.

27. The imageable element of claim 26, wherein the ethylenically unsaturated comonomer is selected from the group consisting of: acrylic acid, methacrylic acid, acrylic acid ester, methacrylic acid ester, hydroxyethyl acrylate, hydroxyethyl methacrylate, hydroxypropyl acrylate, hydroxypropyl methacrylate, acrylamide, methacrylamide, N-methylacrylamide, N-methylmethacrylamide, acrylonitrile, methacrylonitrile, vinyl chloride, vinylidene chloride, vinyl acetate, vinyl ether, styrene, N-phenylmaleimide, and a mixture thereof.

28. The imageable element of claim 1, wherein the bottom layer comprises a supramolecular polymer including units having the formula:

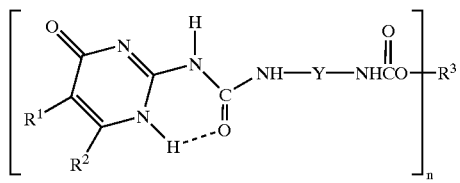

wherein each $R^1$ and $R^2$ is independently selected from the group consisting of: hydrogen and hydrocarbyl;

wherein Y is a hydrocarbylene derived from a diisocyanate represented by the formula $Y(NCO)_2$;

wherein $R^3$ is a phenolic residue derived from a polyfunctional phenolic resin represented by the formula $R^3(OH)_n$; and wherein n is at least 1.

29. The imageable element of claim 28, wherein the polyfunctional phenolic resin is selected from the group consisting of: phenol/cresol novolak, polyvinyl phenol polymer, vinyl phenol/hydrocarbyl acrylate copolymer, pyrogallol/acetone polymer and a mixture thereof.

30. The imageable element of claim 1, further comprising a photothermal converter material.

31. The imageable element of claim 1, wherein the thermally imageable composition that is free of the first thermally sensitive supramolecular polymer comprises a novolak resin and an infrared dye.

32. The imageable element of claim 1, wherein the top layer comprises the first thermally sensitive supramolecular polymer, and wherein the first and the second thermally sensitive supramolecular polymers are the same.

33. The imageable element of claim 1, wherein the top layer comprises the first thermally sensitive supramolecular polymer, and wherein the first and the second thermally sensitive supramolecular polymers are different thermally sensitive supramolecular polymers.

34. The imageable element of claim 1, wherein the thermally reversible non-covalently bonded unit in the bottom layer includes a three-centered H-bond.

35. The imageable element of claim 34, wherein the three-centered H-bond comprises a cyclic imide group and a 2,6-diaminotriazine group.

36. The imageable element of claim 34, wherein the second thermally sensitive supramolecular polymer in the bottom layer comprises a maleimide/styrene copolymer associated with a 4-vinyl-2,6-diaminotriazine/styrene copolymer, with the proviso that the copolymers comprise at least one base-soluble functional group selected from the group consisting of: carboxylic, sulfonic, imide, N-acyl sulfonamide and phenolic hydroxy.

37. An imageable element comprising:
a substrate;
a top layer comprising a first thermally imageable composition comprising a first thermally sensitive supramolecular polymer which exhibits an increased solubility in an aqueous developer solution upon exposure to heat; the first thermally sensitive supramolecular polymer comprising: at least one covalently bonded unit; and at least one thermally reversible non-covalently bonded unit, which includes a two or more centered H-bond within each non-covalently bonded unit; and disposed between the substrate and the top layer, a bottom layer comprising a second thermally imageable composition comprising a second thermally sensitive supramolecular polymer which exhibits an increased solubility in an aqueous developer solution upon exposure to heat; the second thermally sensitive supramolecular polymer comprising: at least one covalently bonded unit; and at least one thermally reversible non-covalently bonded unit, which includes a two or more centered H-bond within each non-covalently bonded unit.

38. The imageable element of claim 37, wherein the thermally reversible non-covalently bonded unit in the bottom layer includes a four-centered H-bond.

39. The imageable element of claim 37, wherein the thermally reversible non-covalently bonded unit in the bottom layer includes a three-centered H-bond.

40. The imageable element of claim 37, wherein the thermally reversible non-covalently bonded unit in the top layer includes a four-centered H-bond.

41. The imageable element of claim 37, wherein the thermally reversible non-covalently bonded unit in the top layer includes a three-centered H-bond.

42. A method of producing an imaged element comprising the steps of:
providing an imageable element comprising a substrate; a top layer comprising: (a) a first thermally imageable composition comprising a first thermally sensitive supramolecular polymer which exhibits an increased solubility in an aqueous developer solution upon exposure to heat; the first thermally sensitive supramolecular polymer comprising: at least one covalently bonded unit; and at least one thermally reversible non-covalently bonded unit, which includes a two or more centered H-bond within each non-covalently bonded unit or (b) a thermally imageable composition free of the first thermally sensitive supramolecular polymer; and disposed between the substrate and the top layer, a bottom layer comprising a second thermally imageable composition comprising a second thermally sensitive supramolecular polymer which exhibits an increased solubility in an aqueous developer solution upon exposure to heat; the second thermally sensitive supramolecular polymer comprising: at least one covalently bonded unit; and at least one thermally reversible non-covalently bonded unit, which includes a three or more centered H-bond within each non-covalently bonded unit;

imagewise exposing the imageable element to thermal radiation to produce exposed regions; and contacting the exposed imageable element and a developer within a period of time after the exposing step to remove the exposed regions and thereby produce the imaged element.

43. The method of claim 42, wherein the imageable element further comprises a photothermal converting material.

44. The method of claim 42, wherein the step of imagewise exposing the imageable element to thermal radiation is carried out using an infrared laser.

45. The method of claim 42, wherein the period of time is up to 1 hour.

46. The method of claim 42, wherein the thermal radiation has a pixel dwell time of not more than 100 µs.

* * * * *